United States Patent
Wardhan et al.

(10) Patent No.: US 12,135,678 B2
(45) Date of Patent: Nov. 5, 2024

(54) DATA LINK STABILITY DETECTION USING COMPUTER VISION-BASED DATA EYE ANALYSIS

(71) Applicant: QUALCOMM INCORPORATED, San Diego, CA (US)

(72) Inventors: Uttkarsh Wardhan, Bangalore (IN); Vishal Ghorpade, Bangalore (IN); Sanku Mukherjee, Bangalore (IN); Madan Krishnappa, San Diego, CA (US); Sanath Sreekanta, Bangalore (IN); Pankhuri Agarwal, Bangalore (IN); Santanu Pattanayak, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 18/041,168

(22) PCT Filed: Apr. 23, 2021

(86) PCT No.: PCT/US2021/028852
§ 371 (c)(1),
(2) Date: Feb. 9, 2023

(87) PCT Pub. No.: WO2022/035474
PCT Pub. Date: Feb. 17, 2022

(65) Prior Publication Data
US 2023/0267096 A1    Aug. 24, 2023

(30) Foreign Application Priority Data

Aug. 14, 2020  (IN) .............................. 202041034975

(51) Int. Cl.
*G06F 15/78* (2006.01)
*G05B 13/00* (2006.01)

(52) U.S. Cl.
CPC ......... *G06F 15/7814* (2013.01); *G05B 13/00* (2013.01)

(58) Field of Classification Search
CPC ........................... G06F 15/7814; G05B 13/00
USPC ........................................................ 709/224
See application file for complete search history.

(56) References Cited

U.S. PATENT DOCUMENTS

2006/0182215 A1 *   8/2006   Dreps ..................... H04L 7/005
                                                        375/372

FOREIGN PATENT DOCUMENTS

EP            3535625 A1 *  9/2019  ........... G05B 19/042

OTHER PUBLICATIONS

International Search Report and Written Opinion—PCT/US2021/028852—ISA/EPO—Aug. 30, 2021.

* cited by examiner

*Primary Examiner* — Glenford J Madamba
(74) *Attorney, Agent, or Firm* — Smith Tempel Blaha LLC/Qualcomm

(57) ABSTRACT

The reliability of a data communication link may be analyzed and otherwise maintained by collecting a two-dimensional array representing a functional data eye, and using a convolutional neural network to determine a score of the functional data eye. The determined score may be compared with a threshold, and an action may be initiated based on the result of the comparison.

30 Claims, 15 Drawing Sheets

DATA LINK STABILITY DETECTION USING COMPUTER VISION-BASED DATA EYE ANALYSIS

DESCRIPTION OF THE RELATED ART

Computing devices are increasingly controlling mission-critical or safety-critical systems, such as autonomous vehicles (e.g., automobiles, drones, etc.), industrial automation, medical devices, and various devices within the realm of the internet-of-things ("IoT"). Maintaining the reliability of such systems is an important objective.

A computing device may include multiple subsystems that communicate with one another via high-speed data communication interfaces or links. The communicating subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity. An SoC may be coupled to one or more memory chips via a data communication link. High-speed, synchronous types of memory, such as double data-rate synchronous dynamic random access memory ("DDR-SDRAM") require precise timing between data and clock signals to maintain reliability. Noise and other environmental stressors may adversely affect these signals.

A data eye is a representation of the data signal on a communication link in the form of a voltage versus time plot, such as may be produced by a high-speed oscilloscope. The term data eye refers to the shape of the characteristic opening or region in which minimal data signal transitions occur. Communication link stability is maximized when the clock edge is aligned with the center of the data eye. Noise and other environmental stressors may distort the data eye. For this reason, techniques have been developed by which a data link is periodically trained to re-align the clock edge with the center of the data eye. Data link training may not result in improved performance if the eye has become severely distorted. Also, data link training is not generally used to determine whether a data link has become so impaired that other actions, such as maintenance, may need to be taken to avert failures.

SUMMARY OF THE DISCLOSURE

Systems, methods, computer program products, and other embodiments are disclosed for detecting and otherwise maintaining reliability of a data communication link in a computing device.

An exemplary method for maintaining reliability of a data communication link in a computing device may include collecting a two-dimensional array of data points representing a data eye on the data communication link. The method may further include determining, using a convolutional neural network, a score of the two-dimensional array of data points. The method may still further include comparing the determined score with a threshold. The method may also include initiating an action based on a result of comparing the determined score with the threshold.

An exemplary system for maintaining reliability of a data communication link in a computing device may include a first subsystem and a second subsystem coupled by the data communication link. One of the subsystems may have a processor system configured with a convolutional neural network. The subsystem may be configured to collect a two-dimensional array of data points representing a data eye on the data communication link. The subsystem may further be configured to determine, using the convolutional neural network, a score of the two-dimensional array of data points. The subsystem may still further be configured to compare the determined score with a threshold. The subsystem may also be configured to initiate an action based on a result of comparing the determined score with the threshold.

An exemplary computer program product for maintaining reliability of a data communication link in a computing device may include a computer-readable medium having stored thereon in computer-executable form instructions that, when executed by a processing system, configure the processing system to: collect a two-dimensional array of data points representing a data eye being communicated on a data communication link; determine, using a convolutional neural network, a score of the two-dimensional array of data points; compare the determined score with a threshold; and initiate an action based on a result of comparing the determined score with the threshold.

Another exemplary system for maintaining reliability of a data communication link in a computing device may include means for collecting a two-dimensional array of data points representing a data eye being communicated on the data communication link. The system may further include means for determining a score of the two-dimensional array of data points. The system may still further include means for comparing the determined score with a threshold. The system may also include means for initiating an action based on a result of comparing the determined score with the threshold.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
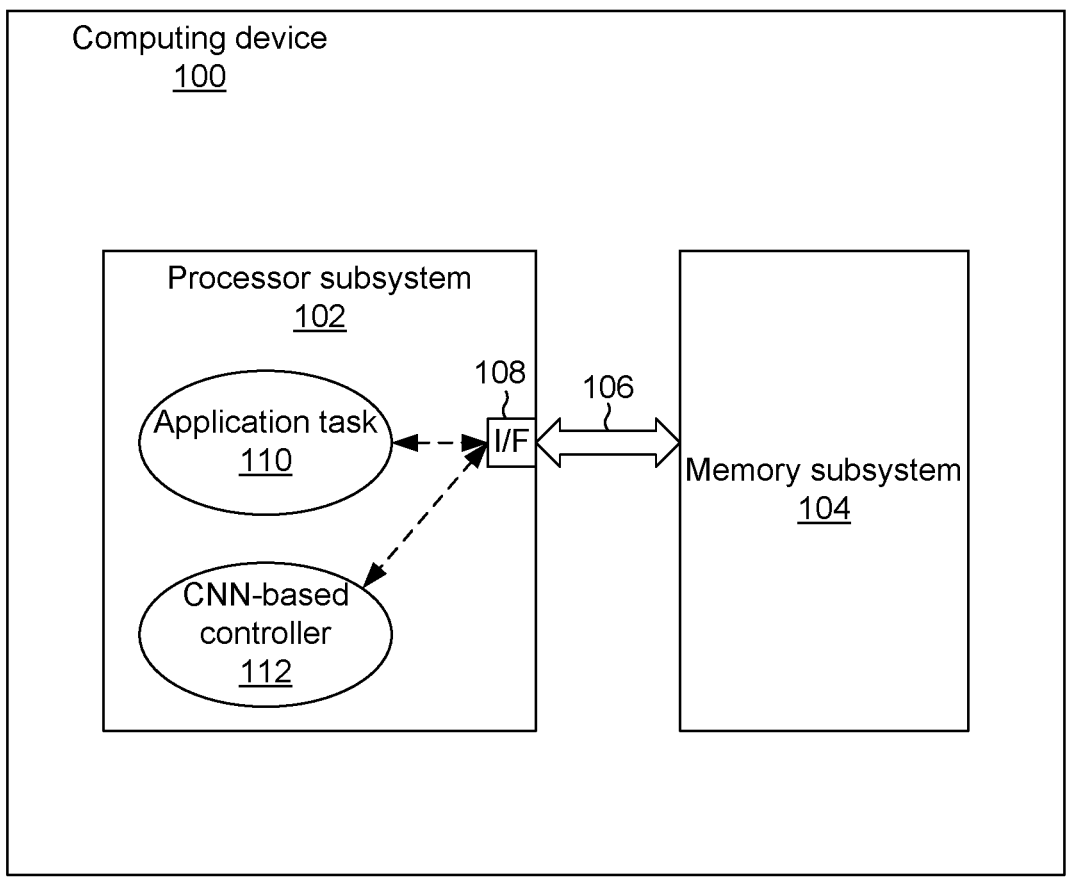
FIG. 1 is a block diagram illustrating a computing device having two subsystems coupled by a data communication link, in accordance with exemplary embodiments.

As shown in FIG. 1, in an illustrative or exemplary embodiment, a computing device 100 may include a processor subsystem 102 and a memory subsystem 104 coupled together via a bidirectional data communication link 106. The data communication link 106 may comprise any number of signal lines, configured to convey data signals, clock signals, etc. The systems, methods and computer program products described in this disclosure may be employed to evaluate and otherwise maintain the reliability of the data communication link 106. It should be understood that although in the exemplary embodiments described in this disclosure the data communication link 106 is between a processor subsystem 102 and a memory subsystem 104 and configured to convey memory traffic, in other embodiments such a data communication link may be between any other types of computing device subsystems and may be configured to communicate (i.e., transmit and receive) any other type of data traffic. For example, in such other embodiments the data communication link may be a Peripheral Component Interconnect express ("PCIe") bus, a Universal Serial Bus ("USB"), or any other type of interface or data communication link that is not inconsistent with the principles described in this disclosure. In the exemplary embodiment shown in FIG. 1, the data communication link may be between separate chips, such as between an SoC that includes a first subsystem (e.g., the processor subsystem 102) and a chip that includes a second subsystem (e.g., the memory subsystem 104). In other embodiments (not shown), the data communication link may be between first and second subsystems (e.g., the processor subsystem 102 and the memory subsystem 104) included within the same chip. In still other embodiments (not shown), the data communication link may be between chiplets.

In the exemplary embodiment shown in FIG. 1, the memory subsystem 104 may comprise, for example, a double data-rate synchronous dynamic random access memory ("DDR-SDRAM") chip. The processor subsystem 102 may comprise, for example, a system-on-a-chip ("SoC"). The processor subsystem 102 may include a controllable communication link interface 108 that can be configured to adjust aspects of operation of the data communication link 106 that affect link quality, such as relative timing between clock and data signals being conveyed on the data communication link 106.

An application task 110 may execute on a processor (not separately shown) of the processor subsystem 102. The application task 110 (i.e., processor structures as configured by software in execution) may be any task, process, thread, etc., that communicates a data stream via the data communication link 106 with the memory subsystem 104. In the exemplary embodiment shown in FIG. 1, the data stream comprises memory traffic (i.e., write transactions, read transactions, etc.). The memory traffic is communicated via the communication link interface 108.

A convolutional neural network ("CNN")-based controller 112 also may execute on a processor (not separately shown) of the processor subsystem 102. The CNN-based controller 112 is coupled to the communication link interface 108. Through the communication link interface 108, the CNN-based controller 112 may monitor the data stream being communicated between the application task 110 and the memory subsystem 104. The CNN-based controller 112 may also be configured to control aspects of the controllable communication link interface 108, such as relative timing between clock and data signals being conveyed on the data communication link 106. The CNN-based controller 112 may further be configured to initiate write and read transactions with the memory subsystem 104.

Figure 2:
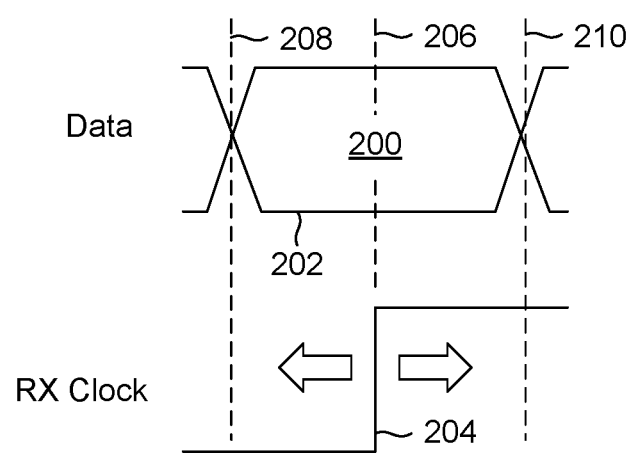
FIG. 2 is a timing diagram illustrating a data signal eye relative to a clock signal, in accordance with exemplary embodiments.

As shown in FIG. 2, a data eye 200 is defined or characterized by transitions of a data signal 202. Within the data eye 200, i.e., bounded by successive transitions of the data signal 202, the bit value may be high ("1") or low ("0"). A data stream may consist of many successive bits, transmitted at a bit rate of the data communication link 106 (FIG. 1), and the data eye 200 may represent a composite of such successive bits. To properly sample or capture data transmitted on a signal line (i.e., one bit) of the data communication link 106 (FIG. 1), the edge 204 of the clock signal (RX Clock) must be properly aligned in time with the data eye 200, such as, for example, in the center of the data eye 200 at a time 206, where the data eye 200 spans an interval between a time 208 and a time 210. The term "clock-data timing" is used in this disclosure to refer to the time at which the edge 204 of the clock signal occurs within the data eye, i.e., in the interval between time 208 and time 210. In a manner described below, the clock-data timing may be adjusted or set to any value in the range of time 208 to time 210 by delaying either the clock signal or the data signal with respect to the other, so that the edge 204 occurs earlier or later in time with respect to the data eye 200, as conceptually indicated by the arrows in FIG. 2. The communication link interface 108 (FIG. 1) may be controllable to adjust this clock-data timing.

Figure 3A:
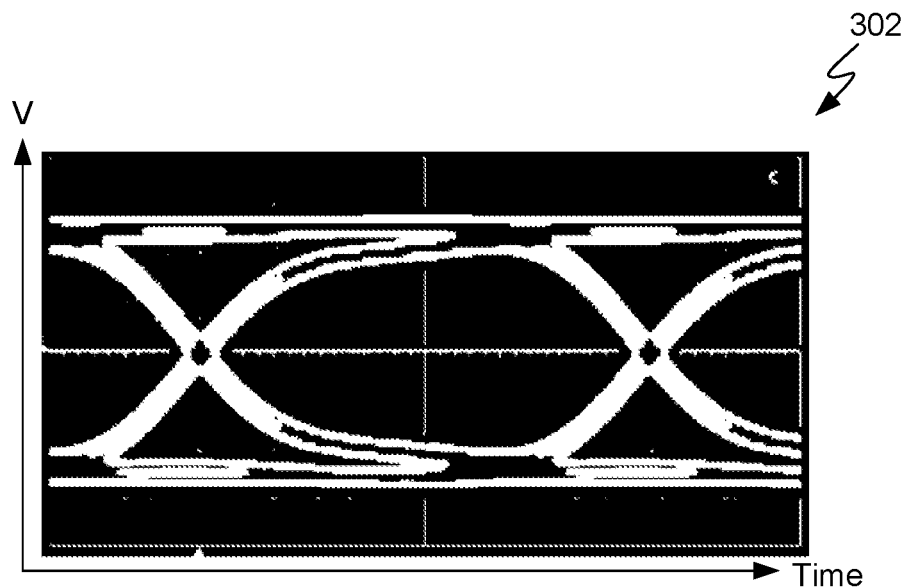
FIG. 3A is an oscilloscope image of a data signal eye, in accordance with exemplary embodiments.

In FIG. 3A, an oscilloscope image 302 shows a data eye in a two-dimensional ("2-D") space defined by a time axis and an amplitude or voltage ("V") axis. As well understood by one of ordinary skill in the art, the image 302 may be obtained by repetitively sampling a single data (bit) line of the data communication link 106 (FIG. 1) synchronously with the bit rate. In contrast with the conceptual depiction of the data eye 200 (FIG. 2), in which the data signal 202 is depicted by well-defined lines, the data eye in the image 302 is further characterized by variations or fluctuations in the oscilloscope signal trace over many successive bits. In the image 302, a region is white where the signal trace occurs more frequently and black where the signal trace occurs less frequently. While the image 302 is rendered in FIG. 3A in monochrome for clarity, similar data eye images are commonly rendered in color, with different colors representing different frequencies or densities of signal trace occurrence. Regardless of how a signal trace may be rendered, a region in which the signal trace occurs less frequently than in the surrounding regions may define the data eye, i.e., a region in which the bit value is most stable. Nevertheless, it may be noted that the frequency or density of occurrence of the signal trace follows somewhat of a gradient, with a minimum at the center of the data eye and generally increasing with distance from the center. A large data eye, i.e., a central region in which the signal trace frequency is low over a large, well-defined region, indicates that the data value is stable over a large region. Such a data eye may be referred to as a higher-quality data eye. A higher-quality data eye yields more accurate data value samples using a clock signal (not shown in FIG. 3A) because the clock edge more frequently occurs during a time when the data value is stable. A data eye that is smaller or less symmetrical generally yields less accurate data value sampling using a clock signal and may be referred to as a lower-quality data eye relative to the aforementioned higher-quality data eye. One of ordinary skill in the art is readily capable of judging data eye quality among two or more data eyes and of ranking the data eyes in quality relative to each other. Unless otherwise stated, the terms "higher" quality and "lower" quality are used in this disclosure to describe data eyes in a data set relative to each other and not relative to other criteria.

Figure 3B:
FIG. 3B is an oscilloscope image of another data signal eye, in accordance with exemplary embodiments.

In FIG. 3B, an oscilloscope image 304 shows a data eye that is lower quality than the data eye shown in the oscilloscope image 302 (FIG. 3A). Such a lower-quality data eye may occur when a data line experiences electromagnetic noise or other environmental stressors. The data eye in the image 304 is therefore less conducive to accurate sampling using a clock signal.

Figure 4:
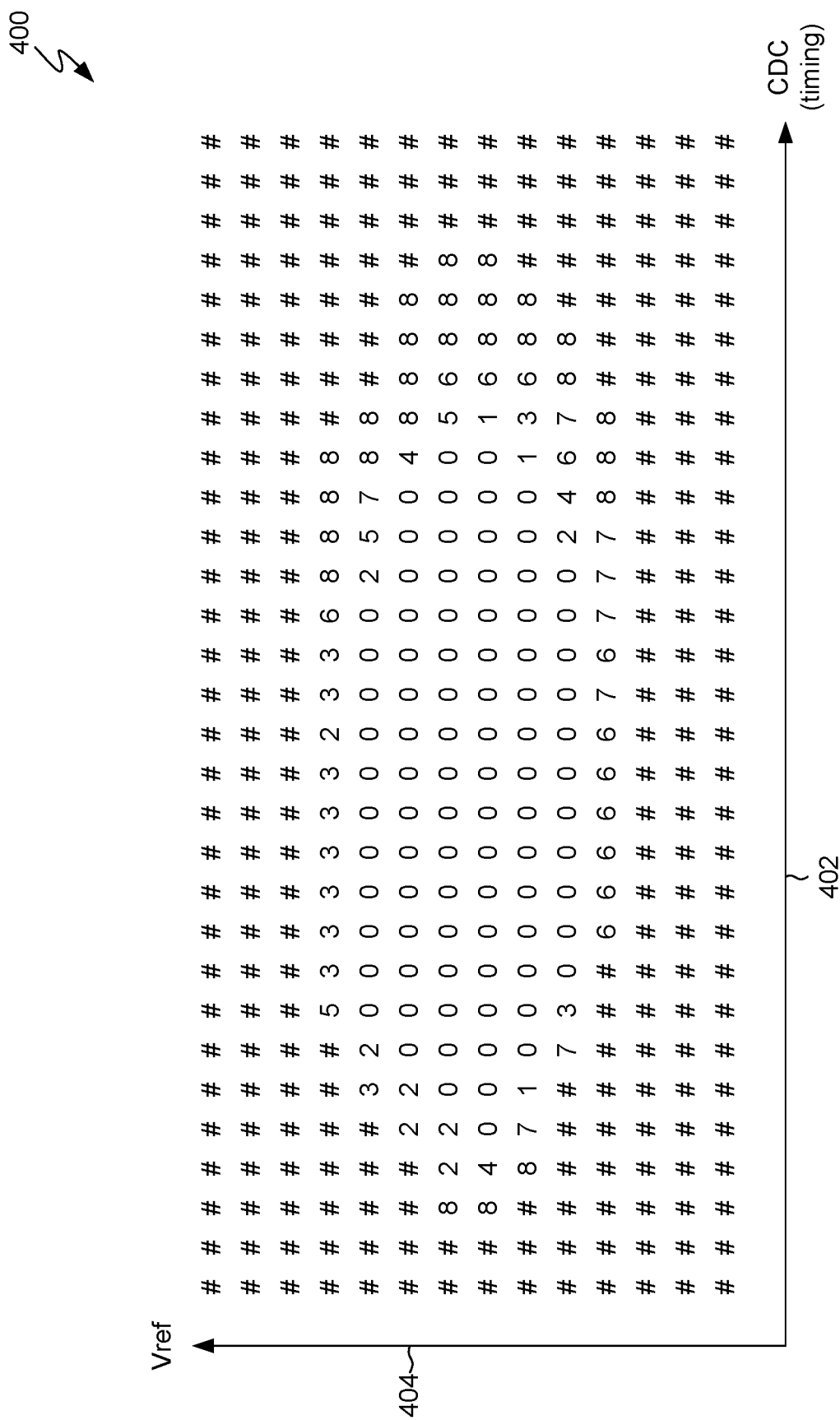
FIG. 4 is a plot illustrating a functional data eye or two-dimensional array of data points, in accordance with exemplary embodiments.

As shown in FIG. 4, a 2-D array 400 represents an example of a data eye formed using information that quantitatively characterizes how well the data eye is likely to yield accurate data value sampling using a clock signal (not shown). The array 400 may also be referred to as a "functional" data eye to distinguish it from a traditional, oscilloscope-generated data eye (image) of the type described above with regard to FIGS. 3A-3B.

The data points that the array 400 comprises are indexed by clock-data timing on the horizontal axis and reference voltage ("Vref") on the vertical axis. The reference voltage is a threshold that determines whether a data capture buffer (not shown) samples or captures a value of "1" or "0." That is, a value of "1" is captured when the data signal voltage is above the reference voltage when the clock edge occurs, and a value of "0" is captured when the data signal voltage is below the reference voltage when the clock edge occurs. The value or number at each point in the array 400 is indicative of the stability of the data signal. (The numerical values and their pattern shown in FIG. 4 are intended only as examples.) For example, the value may represent a count of the number of times that a sampled bit value failed to match an expected bit value. In the example shown in FIG. 4, a value of zero represents a point of maximum data stability and therefore a point within the region defining the data eye. The data eye may generally be defined by a pattern in which a large, contiguous region of data points having low values, such as zero, is surrounded by data points having higher values, generally increasing with distance from a center of the data eye. (Values in the array 400 represented by a hash symbol ("#") represent numerical values greater than a threshold and may be omitted from the data eye analysis described herein.)

It is known in the art to form a functional data eye (e.g., the array 400) by operating a data communication link while sweeping both the reference voltage and clock-data timing over their respective ranges. For example, the clock-data timing may be initialized to a predetermined minimum (e.g., one end of the range described above with regard to FIG. 2) and then incremented in steps until a predetermined maximum (e.g., the other end of the range) is reached. At each step of the clock-data timing, the reference voltage may similarly be initialized to a predetermined minimum and then incremented in steps until a predetermined maximum is reached. When the maximum reference voltage is reached, the clock-data timing may again be incremented. Under operating conditions of each unique combination of clock-data timing and reference voltage, sampled data may be compared with expected data. For example, a test data value may be written to a memory and then read back from the memory over a data communication link. A mis-match between a bit that was written and a bit that was read back may be attributed to diminished signal quality, under a presumption that the memory system is otherwise operating properly (which, as understood by one of ordinary skill in the art, can be analyzed in other ways not related to the present disclosure). Sampled data may be compared with expected data in this manner a number of times under operating conditions of each unique combination of clock-data timing and reference voltage. Each time such a mismatch or failure is detected, the count is incremented. Any number of arrays 400 may be formed in this manner. The arrays 400 may be displayed (e.g., rendered in the graphical manner depicted in FIG. 4) for visual inspection by engineers or other persons. It is known for such persons to judge data eye quality using such functional data eyes.

Figure 5:
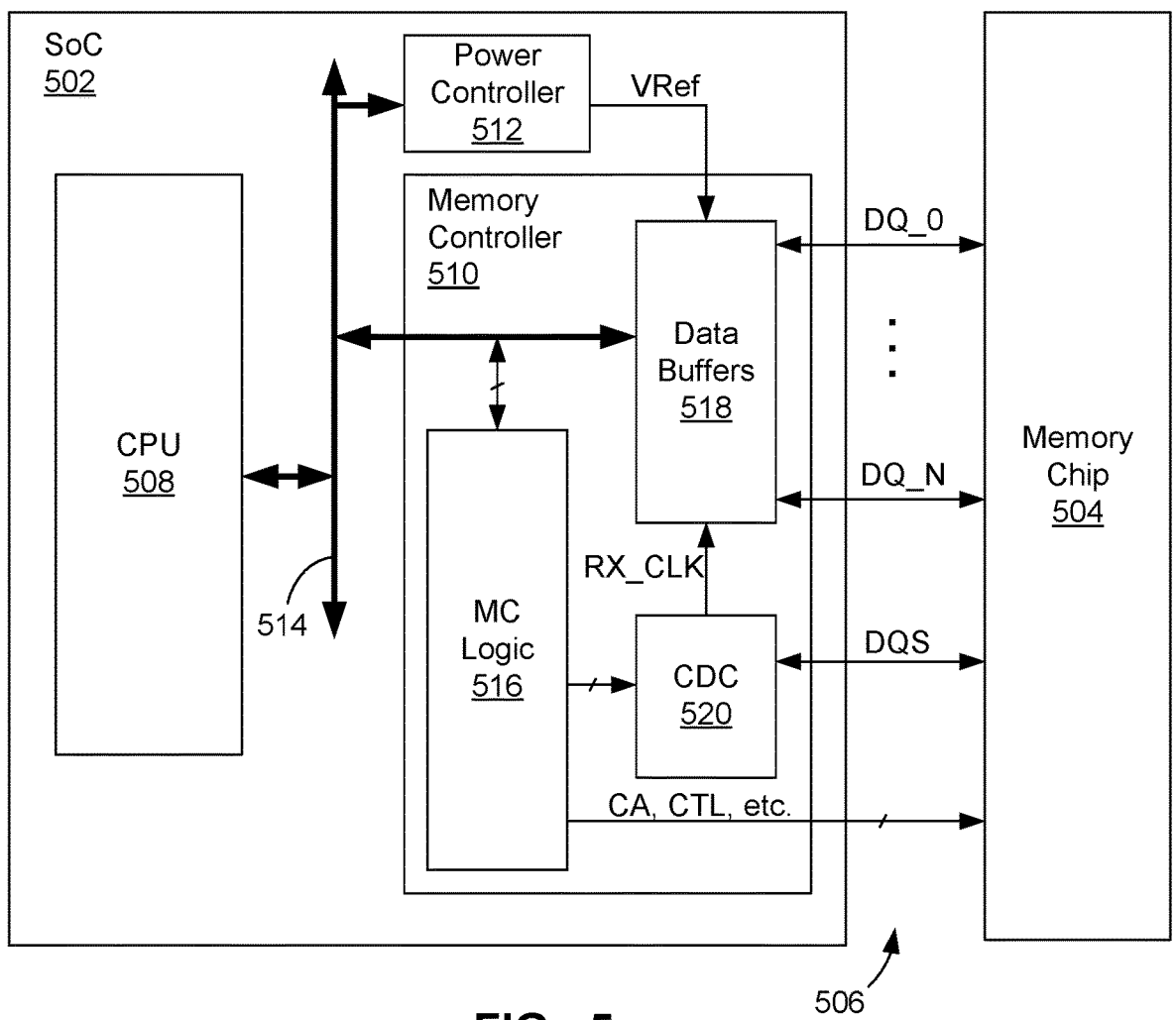
FIG. 5 is a block diagram showing an interface between an SoC and a memory chip, in accordance with exemplary embodiments.

As shown in FIG. 5, an SoC 502 may communicate with a memory chip 504 via a data communication link 506. The SoC 502 may include a CPU 508 (also sometimes referred to as an application processor), a memory controller 510, a power manager or controller 512, and other elements (not shown for purposes of clarity). The CPU 508, the memory controller 510, and the memory chip 504 may examples of the processor subsystem 102, the interface 108, and the memory subsystem 104, respectively, described above with regard to FIG. 1. An internal data communication bus 514 may couple the CPU 508 with the memory controller 510 and power controller 512. Although the power controller 512 is included in the SoC 502 in the illustrated embodiment, in other embodiments such a power manager or controller may be a separate chip. Although the power controller 512 may serve a number of functions, including controlling a number of different power supply rails provided to different subsystems, for purposes of the present disclosure it is sufficient to note that the power controller 512 provides the reference voltage (i.e., Vref) to the memory controller 510, and that the power controller 512 may adjust the reference voltage in response to instructions provided by the CPU 508.

As the data communication link 506 is external to the SoC, such as, for example, on a printed circuit board or flex circuit (not shown), it is more susceptible to the adverse effects of noise than, for example, the internal data communication bus 514. The memory chip 504 may be a high-speed synchronous type, such as, for example DDR-SDRAM. Accordingly, the data communication link 506 may comprise a number of data signal lines ("DQ_0"-"DQ_N") that convey data signals, and a clock signal (also referred to as data strobe) line ("DQS") that conveys a clock signal. Each data signal line corresponds to one bit of a data word that may be written to or read back from the memory chip 504.

The memory controller 510 may include memory control logic 516, data buffers 518, and a clock delay control ("CDC") circuit or controller 520. Although not shown for purposes of clarity, the CDC controller 520 may receive a system clock signal, which may be the same frequency as the clock signal under which the CPU 508 operates. The CDC controller 520 provides a controllable delay that, in the illustrated embodiment, delays the system clock signal or a data strobe signal ("DQS") relative to the data signals by an amount determined by the memory control logic 516 or by instructions provided to the memory controller 510 by the CPU 508. The delayed clock signal may be referred to as a receive data capture clock ("RX_CLK") signal. In other embodiments, a similar delay controller (not shown) may delay the data signals relative to a clock signal. The term "clock-data timing" refers to the delay or amount by which the clock signal leads or lags a data signal regardless of whether the controller delays the clock signal relative to the data signal or delays the data signal relative to the clock signal. The clock-data timing may sometimes be referred to as "CDC" for brevity.

The data buffers 518 temporarily store or buffer data values that are the subject of write or read transactions initiated by the CPU 508. For example, the data buffers 518 may be triggered by an edge of the data capture clock to capture a data value provided by the memory chip 504 in response to a read transaction. If the edge of the data capture clock always occurs at a time when a data signal has an amplitude substantially greater than or substantially less than the reference voltage, then the data buffers 518 will capture the correct data values. However, if the edge of the data capture clock occurs at a time when a data signal has an amplitude approximately equal to the reference voltage (as represented by a distorted data eye), then the data buffers 518 may capture erroneous data values. The more distorted the data eye, the higher the probability of the data buffers 518 capturing erroneous data values. As described above, the clock-data timing may be adjusted by the CPU 508 via the memory controller 510. The reference voltage similarly may be adjusted by the CPU 508 via the power controller 512.

Figure 6:
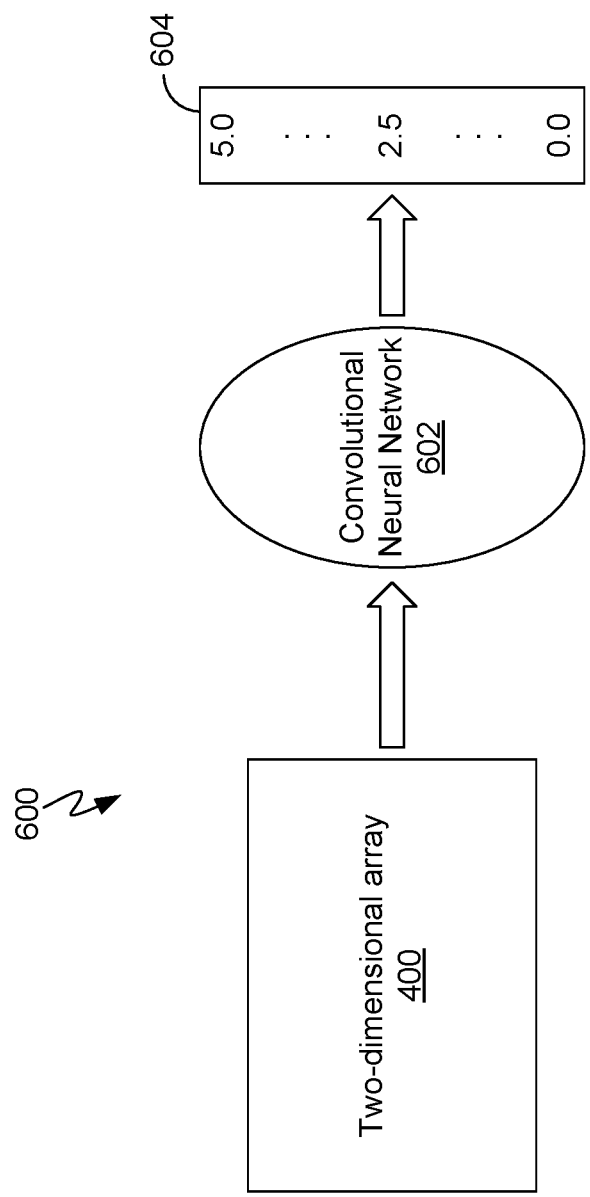
FIG. 6 illustrates in conceptual form a method for maintaining the reliability of a data communication link, in accordance with exemplary embodiments.

As conceptually illustrated in FIG. 6, a method 600 involves employing a convolutional neural network ("CNN") 602 to analyze the above-described 2-D array 400 (FIG. 4). The CNN 602 may output a score 604 that indicates the stability of the data eye (signal) corresponding to the 2-D array 400. The score may be within a numerical range, such as, for example, 0.0 to 5.0. Unlike in the conventional method of persons judging data eye quality based on functional data eyes, the CNN 602 of the present disclosure need not be explicitly provided with patterns or features identified as being relevant to data eye quality. Rather, through neural network training, the CNN 602 learns to identify such relevant features.

Figure 7:
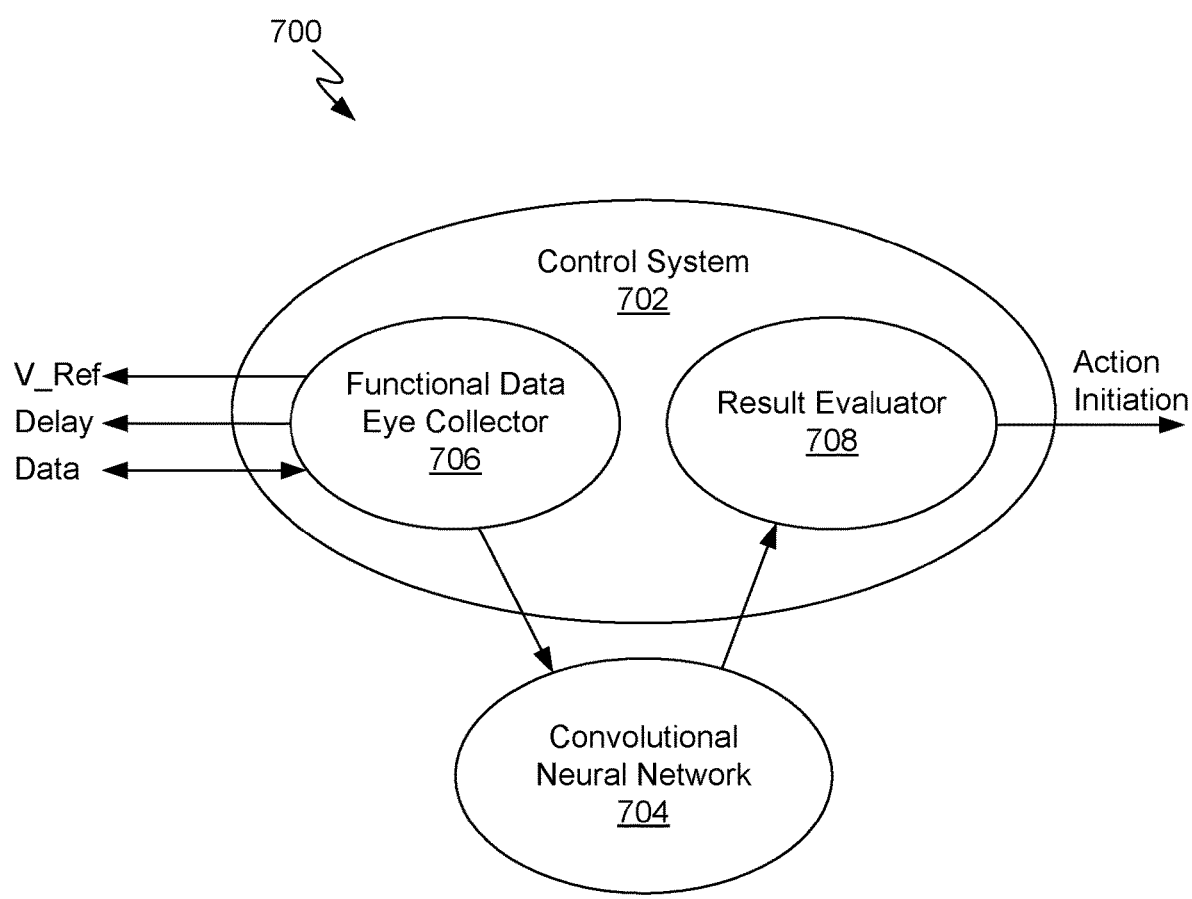
FIG. 7 illustrates a system for maintaining the reliability of a data communication link, in accordance with exemplary embodiments.

As shown in FIG. 7, a CNN-based controller 700 may include a control system 702 and a CNN 704. The CNN-based controller 700 may be an example of the CNN-based controller 112 (FIG. 1), and the CNN 704 may be an example of the CNN 602 (FIG. 6). The control system 702 and CNN 704 may execute on one or more processors, such as, for example, the CPU 508 described above with regard to FIG. 5, or any processor of the processor subsystem 102 described above with regard to FIG. 1, etc. The control system 702 may include a functional data eye collector 706 and a result evaluator 708.

The functional data eye collector 706 may collect functional data eyes 400 as described above with regard to FIG. 4. Accordingly, the functional data eye collector 706 may communicate information with, for example, the memory controller 510 described above with regard to FIG. 5. For example, the functional data eye collector 706 may send clock-data timing and reference voltage instructions to the memory controller 510, which may respond by adjusting the clock-data timing and reference voltage. The functional data eye collector 706 may also initiate memory transactions (e.g., write and read transactions) to which the memory controller 510 may respond by writing data values to or reading data values from the memory chip 504.

The functional data eye collector 706 may provide a functional data eye 400 as a gray-scale image input to the CNN 704. The CNN 704 may be trained and otherwise configured in the manner described below to recognize features in the functional data eye 400 that are relevant to data eye quality, in a manner analogous to that in which conventional neural networks recognize relevant features in photographic images. The CNN 704 may generate a score for the data eye 400 on, for example, a scale of 0.0 to 5.0, as described above with regard to FIG. 6. The result evaluator 708 may receive the score from the CNN 704. Based on the score, the result evaluator 708 may initiate an action. For example, the result evaluator 708 may issue a human-perceptible alert, such as a message recommending to have the computing device undergo maintenance procedures by service personnel. Alternatively, or in addition, the result evaluator 708 may initiate a fail-over, involving switching from an active subsystem to an alternate or back-up subsystem. For example, the result evaluator 708 may switch a data stream from being communicated between the memory subsystem 104 (FIG. 1) and the processor subsystem 102 to being communicated between the memory subsystem 104 and an alternate subsystem (not shown).

In the following description of the architecture of the CNN 704, a well-known symbology is used to describe the order of the layers. In accordance with this symbology, the arrow symbol "→" points from a layer that outputs information to a layer that receives that information as its input. The layer that outputs information also may be described as preceding or before the layer that receives the information as its input, and the layer that receives the information as its input may be referred to as following or after the layer that outputs the information.

The CNN 704 may have the following architecture, for example: INPUT→CONV0(32×3×3)→BATCHNORM→CONV1(64×3×3)→BATCHNORM→CONV2(128×3×3)→BATCHNORM→FLATTEN→DENSE(512)(Dropout0.2)→DENSE(128)(Dropout0.2)→DENSE(16)→OUTPUT.

The input layer ("INPUT") represents the above-described 2-D array of data points. Three convolutional layers may follow the input layer. As well understood by one of ordinary skill in the art, a convolutional layer extracts features from a source image. The first convolutional layer ("CONV0") may comprise 32 filters, each 3×3 in size. The second convolutional layer ("CONV1") may comprise 64 filters, each 3×3 in size. The third convolutional layer ("CONV2") may comprise 128 filters, each 3×3 in size. As in a conventional neural network that is configured to recognize or classify spatial features, the first, second and third convolutional layers of the CNN 704 are configured during training (described below) to extract features from the 2-D array of data points (i.e., the source image) that are characteristic of data eyes.

A first batch normalization layer ("BATCHNORM") may be included between the first and second convolutional layers; a second batch normalization layer may be included between the second and third convolutional layers; and a third batch normalization layer may be included after the third convolutional layer. Batch normalization ensures that the received input has a mean of zero and a standard deviation of one. To increase stability of a neural network, batch normalization normalizes the output of a previous activation layer by subtracting the batch mean and dividing by the batch standard deviation. A flattening layer ("FLATTEN") may be provided following the third batch normalization layer. Flattening transforms a 2-D matrix of features into a vector that can be fed into a fully connected neural network classifier.

Three dense layers ("DENSE"), also sometimes referred to as fully connected layers, may follow the above-described convolutional, batch normalization and flattening layers. The dense layers successively interpret or classify the features. "Fully connected" means that the dense layer feeds all outputs from the layer that precedes the dense layer to all neurons of that dense layer, and each neuron of that dense layer provides one output to the layer that follows the dense layer. The first, second and third dense layers in this example have 512, 128 and 16 neurons, respectively.

The dense layers include an activation function. In the exemplary embodiment the activation function may be the hyperbolic tangent activation function ("Tanh").

The additional of the "Dropout" function to the dense layers randomly selects neurons to be ignored during the training phase. They are randomly "dropped out." Thus, the contribution of dropped-out neurons to the activation of downstream neurons is temporally removed on the forward pass, and any weight updates are not applied to the neuron on the backward pass. In this example, each neuron in each of the first and second dense layers is assigned a 20 percent probability of being dropped out on each weight update cycle. The output layer classifies the result in the form of a score ranging from 0.0 to 5.0.

The foregoing architecture description enables one of ordinary skill in the art to implement the CNN 704 using, for example, any of a number of commercially available neural network development software packages. Such commercially available software packages commonly include application program interface ("API") functions that correspond to the above-described convolutional, batch normalization, flattening and dense layers. Accordingly, details of the manner in which these layers, the activation function, and other aspects of the CNN 704 may operate are not described herein.

As understood by one of ordinary skill in the art, a CNN must be trained before it can be used to classify images or otherwise identify features relevant to image classification. Similarly, a CNN structured as described above with regard to FIG. 7 must be trained before it can be used in the methods for maintaining the reliability of a data communication link described herein. Nevertheless, for purposes of continuity with the descriptions above regarding how the CNN-based controller 700 may be used, exemplary methods for maintaining the reliability of a data communication link are described first, with reference to FIGS. 8 and 9A-9B. Then, exemplary training methods are described (FIGS. 10A-10B).

Figure 8:
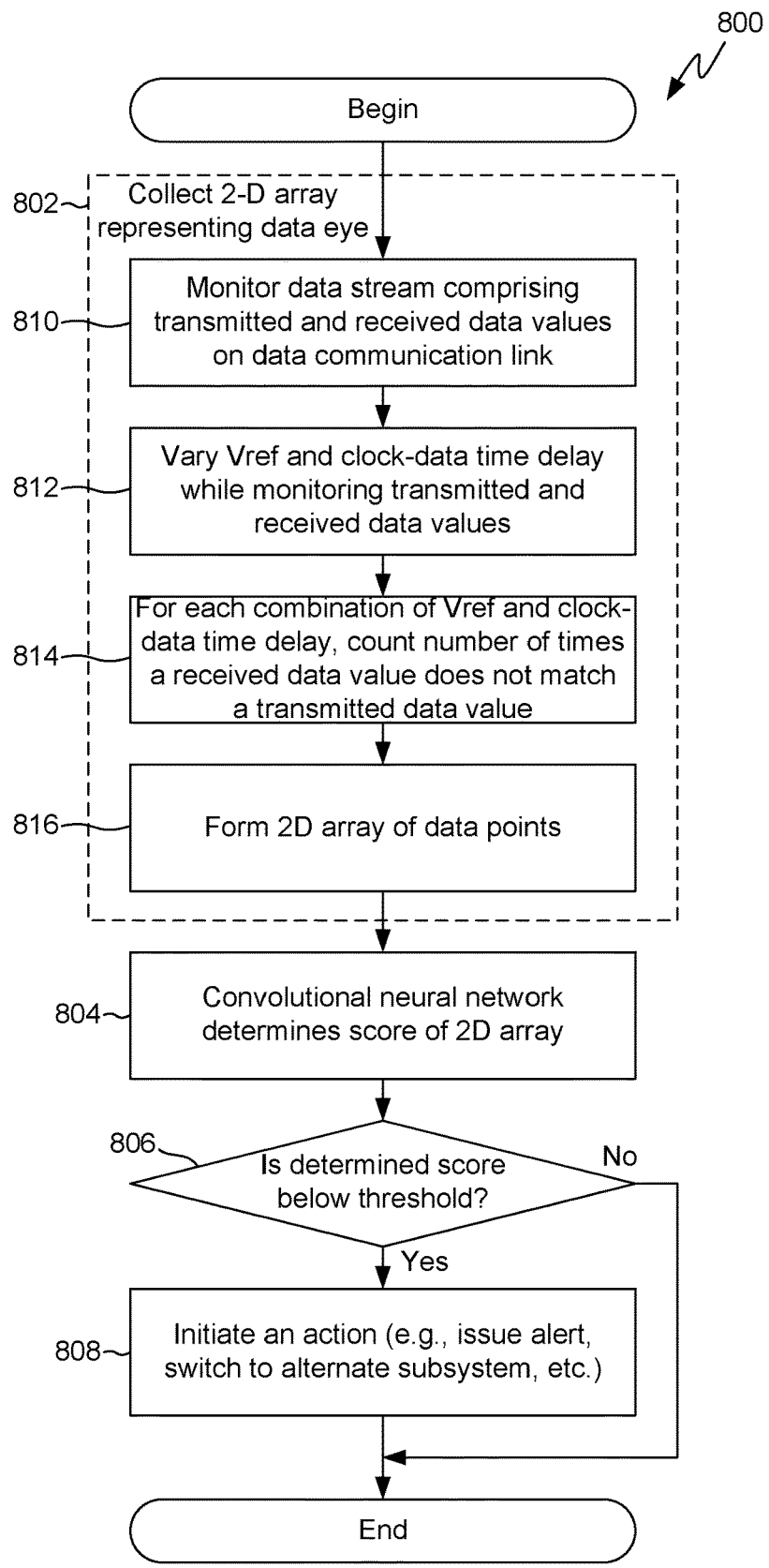
FIG. 8 illustrates in flow diagram form a method for maintaining the reliability of a data communication link, in accordance with exemplary embodiments.

An exemplary method 800 for maintaining the reliability of a data communication link is shown in flow diagram form in FIG. 8. As indicated by block 802, a 2-D array of data points representing a data eye on the data communication link may be collected. As indicated by block 804, a CNN may determine a score of the array. As indicated by block 806, the determined score may be compared with a threshold. An action may then be initiated based on the result of comparing the determined score with the threshold. For example, as indicated by block 808 the action may be initiated if it is determined (block 806) that the score is less than the threshold. Examples of actions include issuing an alert, switching to an alternate subsystem (i.e., fail-over), etc. Different actions may be initiated depending on the score.

Collecting the array in accordance with block 802 may include monitoring a data stream on the data communication link, as indicated by block 810. The data stream may comprise transmitted values, such as data values written to a memory, and received values, such as data values read back from the memory. The data stream may be monitored to detect data mis-matches or other failure indications. As described above with regard to FIG. 4, a mis-match between a data value that was written to the memory and a corresponding data value that was read back from the memory may be counted as a failure and recorded in the array.

Collecting the array in accordance with block 802 may include varying (e.g., incrementing in steps) the reference voltage and clock-data timing while monitoring the transmitted and received data values for failures at each unique combination of reference voltage and clock-data timing, as indicated by block 812. For each unique combination of reference voltage and clock-data timing, the number of times a received data value (e.g., read back from memory) does not match a transmitted data value (e.g., written to memory) is counted, as indicated by block 814. The array may be formed from the failure counts, as indicated by block 816.

Figure 9A:
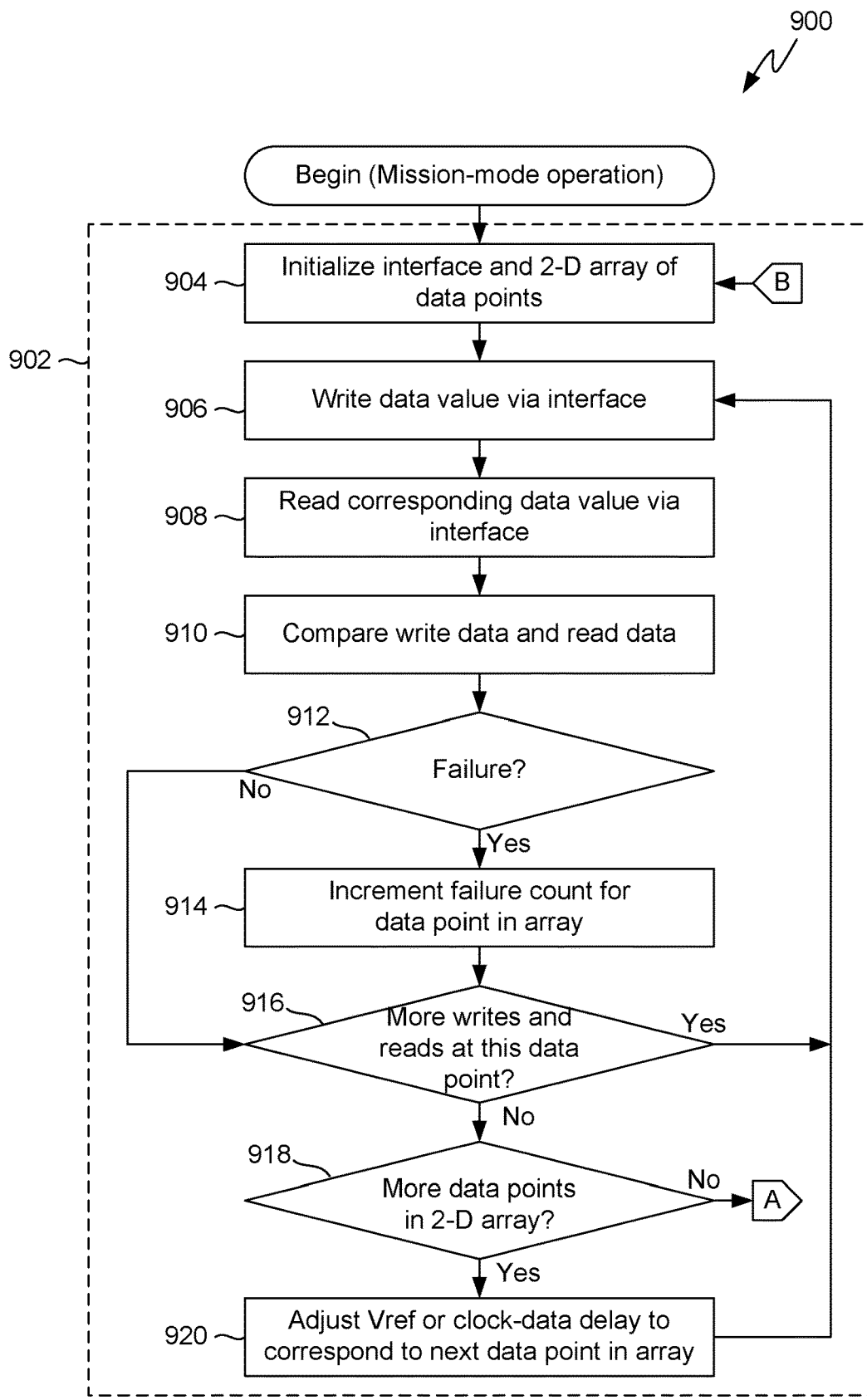
FIG. 9A illustrates in flow diagram form another method for maintaining the reliability of a data communication link, in accordance with exemplary embodiments.
Figure 9B:
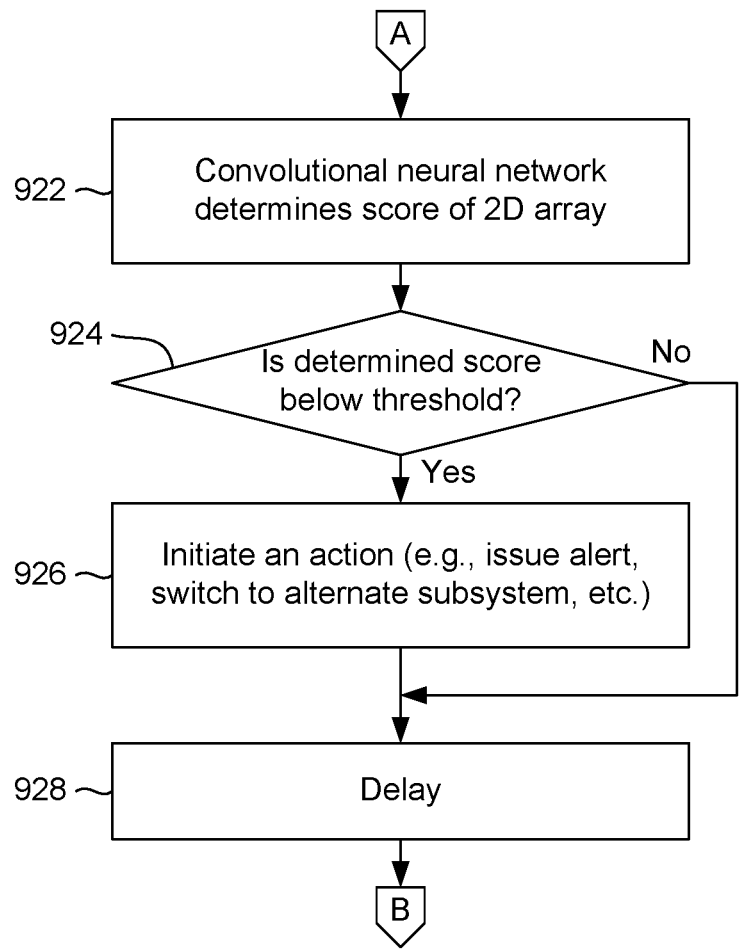
FIG. 9B is a continuation of the flow diagram of FIG. 9A.
Figure 10A:
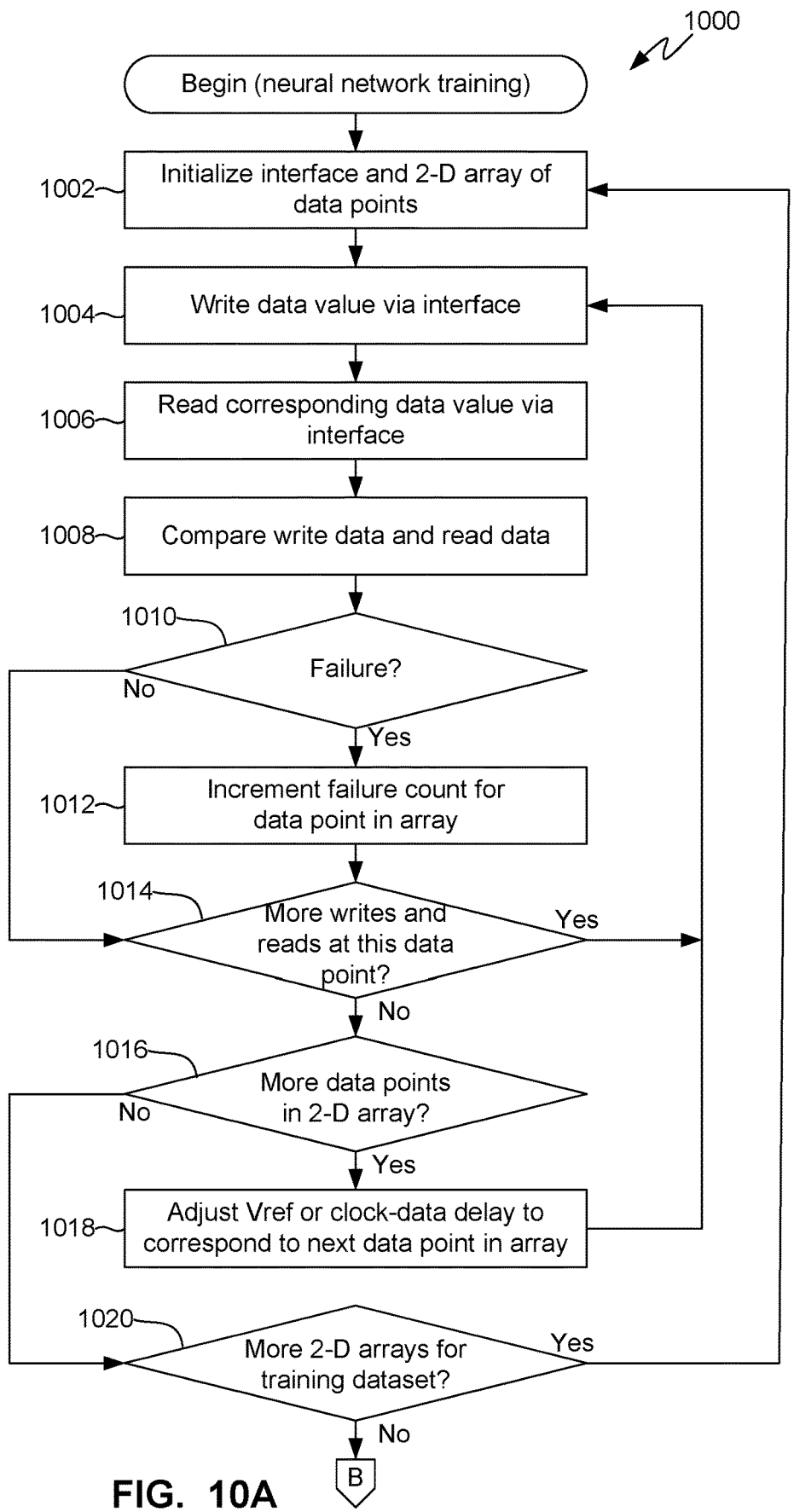
FIG. 10A illustrates in flow diagram form a method for training a convolutional neural network, in accordance with exemplary embodiments.
Figure 10B:
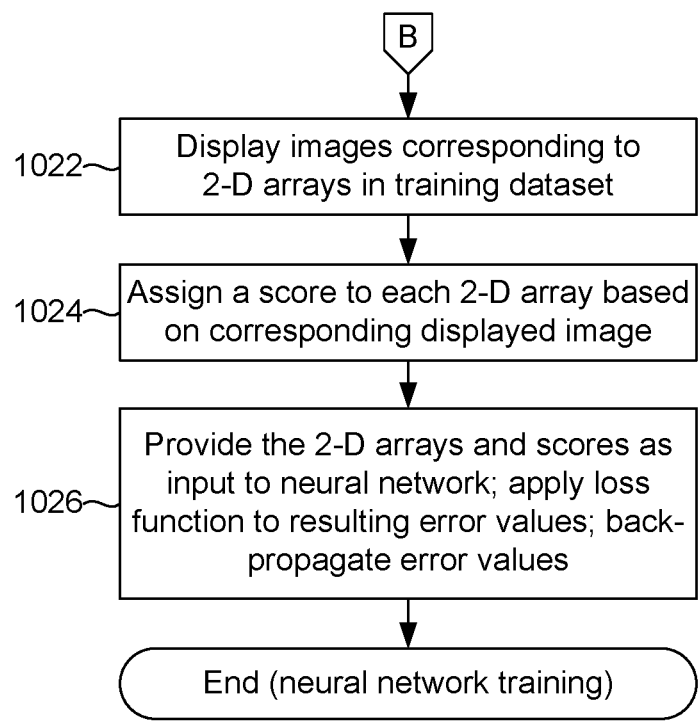
FIG. 10B is a continuation of the flow diagram of FIG. 10A.

Another exemplary method 900 for maintaining the reliability of a data communication link is shown in flow diagram form in FIGS. 9A-9B. The method 900 may be an example of the above-described method 800. The method 900 may be performed at intervals, such as periodically during the operation of a computing device. The method 900 may be performed, for example, during intervals of inactivity or low activity of the data communication link. The method 900 may be performed at such intervals while a computing device is otherwise being used for its ordinary or "mission-mode" purposes by a user (e.g., using an autonomous vehicle, drone, etc.). The method 900 may be performed under the control of, for example, the above-described CNN-based controller 700 (FIG. 7) or 112 (FIG. 1). The data communication link to which the method 800 relates may be, for example, the data communication link 106 described above with regard to FIG. 1 or the data communication link described above with regard to FIG. 5.

As indicated by block 902, a 2-D array of data points representing a data eye on the data communication link may be collected. As indicated by block 904, collecting the array in accordance with block 902 may include initializing the array (e.g., all data points set to zero) and initializing interface-controllable aspects of the data communication link. For example, the clock-data timing and reference voltage may be set to minimum values within their respective ranges. The array may be similar to the array 400 described above with regard to FIG. 4. As indicated by blocks 906 and 908, respectively, collecting the array of data points in accordance with block 902 may also include writing a data value to a memory location via the data communication link (under conditions determined by the interface settings for clock-data timing and reference voltage) and reading back a corresponding data value from the memory location via the data communication link (under conditions determined by the interface settings for clock-data timing and reference voltage). As indicated by block 910, collecting the array of data points in accordance with block 902 may further include comparing the data value that was written to the memory location with the corresponding data value that was read from the memory location. As each data value may comprise multiple bits, the data values may be compared on a bit-wise basis. The comparison (block 912) may indicate for each bit position whether the comparison (test) result was a failure (i.e., the data bit value that was read back did not match the data bit value that was written) or a pass (i.e., the data bit value that was read back matched the data bit value that was written). If the comparison (block 912) indicates a failure, then the value in the array (i.e., count of the number of failures) is incremented by one, as indicated by block 914. If the comparison (block 912) indicates a pass, then the value in the array is not incremented. Regardless of the comparison result, the test steps described above with regard to block 906-912 may be repeated until it is determined (block 916) that a predetermined number of repetitions or iterations has been reached. That is, for each data point in the array, a predetermined number of tests are performed.

As indicated by block 918, it is determined whether all data points in the array have been obtained. If it is determined (block 918) that all data points in the array have not yet been obtained (i.e., the clock-data timing and reference voltage values have not been swept or varied through the entireties of their respective predetermined ranges from respective minimum values to respective maximum values), then the clock-data timing and/or the reference voltage is incremented, as indicated by block 920. For purposes of clarity, the method 900 does not show a nested loop flow structure in which, for example, clock-data timing is incremented in an outer loop and the reference voltage is incremented in an inner loop. Rather, block 920 is intended to indicate setting the clock-data timing and reference voltage combination to the next unique combination. Following block 920, the method 900 may continue forming the array, beginning as described above with regard to block 904. When it is determined (block 918) that all data points in the array have been obtained, then the method 900 may continue in the following manner with regard to block 922 (FIG. 9B).

As indicated by block 922, a CNN may be used to determine a score of the array. The CNN may be, for example, the CNN 704 described above with regard to FIG. 7. The CNN may be configured to parse the array in a manner similar to which a conventional CNN may be configured to parse a single-channel 2-D gray-scale input image. As a corresponding array may be formed for each data bit signal line of the data communication interface, the CNN may determine a corresponding score for each such array. As indicated by block 924, each determined score may be compared with a threshold. An action may then be initiated based on the result of comparing the determined scores with the threshold. For example, as indicated by block 926 the action may be initiated if it is determined (block 924) that any score is less than the threshold. Examples of actions include issuing an alert, switching to an alternate subsystem (i.e., fail-over), etc. Different actions may be initiated depending on the score. Block 928 indicates that a delay or time interval may elapse before the method 900 is repeated.

The method 900 thus may be performed periodically, interspersed with mission-mode operation of the computing device. In the manner described above, the stability of the data communication link may be periodically analyzed during mission-mode operation of the computing device, and an action may be initiated if the link becomes unstable.

As noted above, before the above-described method 800 (FIG. 8) or 900 (FIGS. 9A-9B) is performed, the CNN must be trained. The CNN may be trained by first collecting a training data set comprising a large number of the above-described 2-D arrays of data points. The number of arrays may be, for example, on the order of tens, hundreds, or even thousands. The arrays in the training data set may be collected in the manner described above. Persons experienced in judging the quality of data eyes may then visually inspect a displayed (i.e., graphical) representation of each array in the training data set and assign each array a score that correlates with the person's judgment of the eye quality. For example, each array may be assigned a score in a range from 0.0 to 5.0, where 0.0 indicates a data eye that the person judges least likely to be accurately sampled (i.e., lowest quality), and 5.0 indicates a data eye that the person judges most likely to be accurately sampled (i.e., highest quality).

Training involves inputting each array in the training data set to the CNN, and back-propagating the resulting model error through the CNN to adjust the node weights in a way that reduces the model error. The "model error" refers to the difference between the CNN-determined score (i.e., the score that the CNN determines in response to an array in the training data set) and the assigned score (i.e., the score that was assigned to that array by a person as described above). Neural networks are commonly trained using an optimization process that requires a loss function to calculate the model error. A neural network development software package of the type described above may include an API feature that enables a loss function to be selected. In the exemplary embodiment described herein, the loss function may be Mean Squared Error ("MSE"). While the MSE loss function is in itself a conventional or well-known neural network loss function, the basic MSE function may be modified in one or more ways in accordance with the present disclosure. For example, instead of a conventional symmetric MSE function, the MSE may be skewed so that a higher MSE multiplier is applied to the base MSE loss when a CNN-determined score deviates from the corresponding assigned score by a greater amount, while a lower MSE multiplier may be applied to the base MSE loss when a CNN-determined score deviates from the corresponding assigned score by a lesser amount. In other words, the MSE loss function may be weighted to apply a higher loss to determined scores higher than corresponding assigned scores by a certain amount and a lower loss to determined scores lower than corresponding assigned scores by the amount. This modified loss function is described in further detail below.

An exemplary method 1000 for training the CNN is shown in flow diagram form in FIGS. 10A-10B. The first several steps relate to obtaining a training data set comprising a number of 2-D arrays of the type described above. As these steps are similar to the steps described above with regard to FIG. 9, they are described only briefly. As indicated by block 1002, a 2-D array and the data communication link control settings may be initialized. As indicated by blocks 1004 and 1006, respectively, a data value may be written to a memory location via the data communication link, and a corresponding data value may be read back from the memory location via the data communication link. As indicated by block 1008, the data value that was written to the memory location may be compared with the corresponding data value that was read from the memory location. The result of the comparison may indicate either a pass or a failure, as indicated by block 1010. If the result of the comparison indicates a failure, then the value in the array (i.e., count of the number of failures) is incremented, as indicated by block 1012. If the result of the comparison indicates a pass, then the value in the array is not incremented. Regardless of the comparison result, the steps described above with regard to block 1004-1010 may be repeated until it is determined (block 1014) that enough tests have been performed to provide a data point in the array.

As indicated by block 1016, it is determined whether all data points in an array have been obtained. If it is determined (block 1016) that all data points in the array have not yet been obtained, then the combination of clock-data timing and reference voltage is set to the next unique combination so as to correspond to the next data point in the array, as indicated by block 1018. Following block 1018, the method 1000 may continue forming the array, beginning as described above with regard to block 1004. When it is determined (block 1016) that all data points in the array have been obtained, then the method 1000 may proceed with obtaining another array, until a predetermined number of arrays have been obtained for the training data set, as indicated by block 1020.

Continuing on FIG. 10B, the method 1000 may include displaying a graphical representation or image of each array in the training data set, as indicated by block 1022. As indicated by block 1024, the method 1000 may further include assigning a score to each array, based on a person's judgment of the quality of the functional eye depicted in the corresponding displayed image. For example, each array may be assigned a score in a range from 0.0 to 5.0, where 0.0 indicates a data eye that the person judges least likely to be accurately sampled (i.e., lowest quality), and 5.0 indicates a data eye that the person judges most likely to be accurately sampled (i.e., highest quality).

As indicated by block 1026, each array in the training data set may be provided as input to the CNN. In response to each array, the CNN determines a score and a model error. A modified MSE loss function may be applied to the error.

Figure 11:
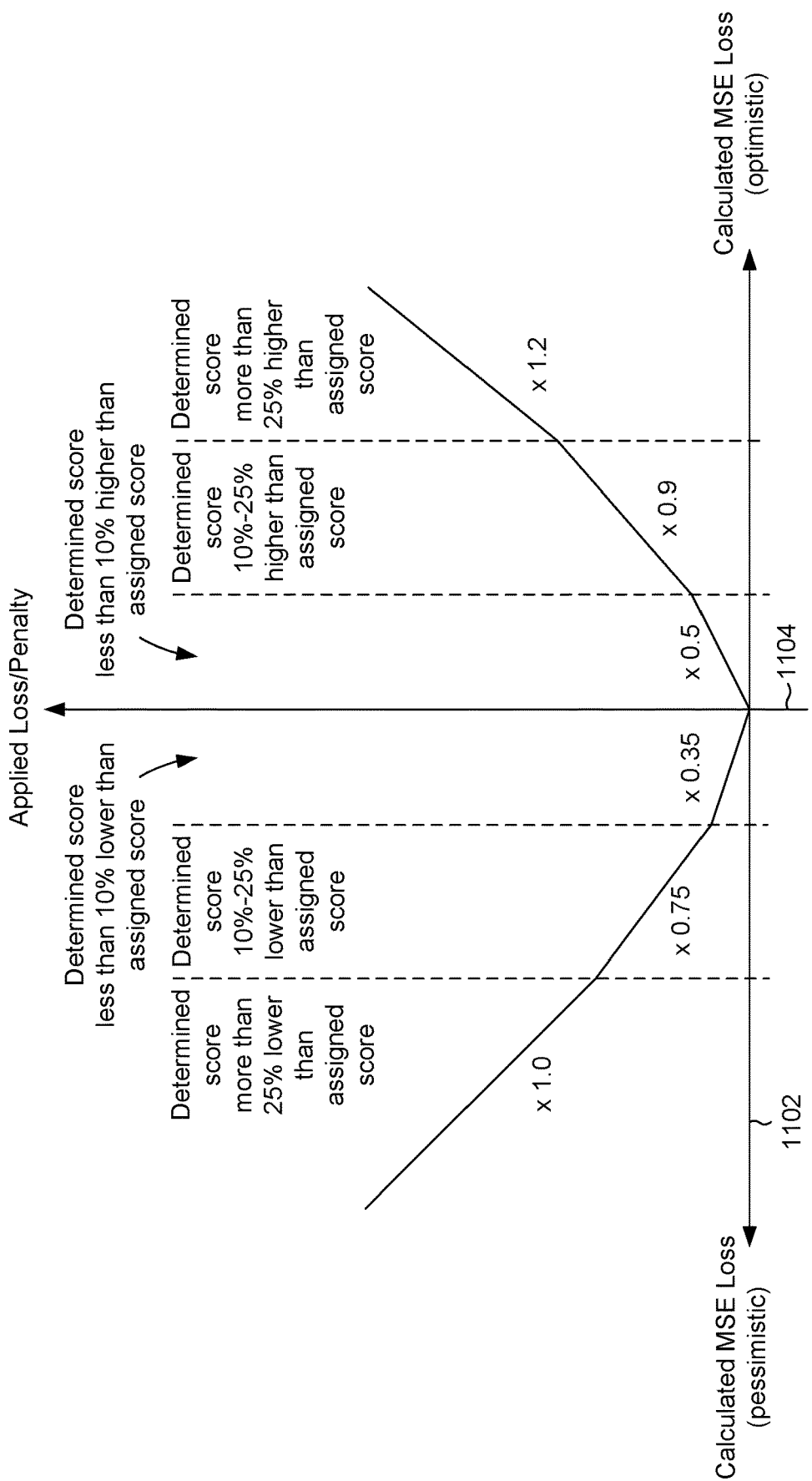
FIG. 11 illustrates a modification of a mean squared error loss function for a convolutional neural network, in accordance with exemplary embodiments.

As shown in FIG. 11, a calculated base MSE loss may be modified by applying a multiplier value. The MSE loss function or equation that determines the calculated base MSE loss is well known and therefore not shown in FIG. 11. In FIG. 11, the horizontal axis 1102 represents the result of applying the model error to the calculated base MSE loss produced by the MSE equation. That is, the calculated base MSE loss may fall anywhere along the horizontal axis 1102. This calculated base MSE loss is the basic loss or penalty that conventionally (i.e., in the absence of modification by a multiplier value as described herein), would be applied to the model error before back-propagating the error through the CNN. The vertical axis 1104 represents the extent to which the calculated base MSE result may be modified by a multiplier value. That is, the vertical axis represents a multiplier value by which the calculated base MSE loss may be multiplied before back-propagating the resulting modified MSE loss. A calculated base MSE loss may be either "optimistic," meaning that the CNN-determined score is higher than the person-assigned score, or "pessimistic," meaning that the CNN-determined score is lower than the person-assigned score. Calculated base MSE losses along the horizontal axis 1102 to the left of the vertical axis 1104 are pessimistic, and calculated MSE losses along the horizontal axis 1102 to the right of the vertical axis 1104 are optimistic.

The MSE loss modification or multiplier function shown in FIG. 11 uses two windows: an inner window ranging between the CNN-determined score being 10% more pessimistic than the person-assigned score and 10% more optimistic than the person-assigned score, and an outer window ranging between the CNN-determined score being 25% more pessimistic than the person-assigned and 25% more optimistic than the person-assigned score. The MSE loss multiplier function most heavily penalizes deviations between the CNN-determined score and the person-determined score that are outside the outer window, less heavily penalizes deviations between the CNN-determined score and the person-determined score that are between the outer window and the inner window, and least heavily penalizes deviations between the CNN-determined score and the person-determined score that are within the inner window. The modified MSE loss function may also more heavily penalize optimistic deviations than pessimistic deviations of the same magnitude, so as to avoid false positives.

For example, if the CNN-determined score is more than 25% lower than the assigned score, a multiplier of 1.0 may be applied to the base MSE before back-propagating the error through the CNN. If the CNN-determined score is more than 25% higher than the assigned score, a multiplier of 1.2 may be applied to the base MSE before back-propagating the error through the CNN. If the CNN-determined score is 10%-25% lower than the assigned score, a multiplier of 0.75 may be applied to the base MSE before back-propagating the error through the CNN. If the CNN-determined score is 10%-25% higher than the assigned score, a multiplier of 0.9 may be applied to the base MSE before back-propagating the error through the CNN. If the CNN-determined score is less than 10% lower than the assigned score, a multiplier of 0.35 may be applied to the base MSE before back-propagating the error through the CNN. If the CNN-determined score is less than 10% higher than the assigned score, a multiplier of 0.5 may be applied to the base MSE before back-propagating the error through the CNN.

Threshold criteria may be established for evaluating the accuracy of the trained CNN and thus to evaluate whether further training may be beneficial. For example, the above-described 10% window may be considered a threshold. That is, a CNN-determined score may be considered a pass if it is within 10% of the person-assigned score. The accuracy of the CNN may be quantified as the percentage of passing scores. An accuracy below a threshold, such as, for example, 97.5%, may indicate that further training may be beneficial. Nevertheless, it should be understood that the threshold criteria described above are only examples, and may be different in other embodiments.

As described above with regard to block 808 (FIG. 8) and 926 (FIG. 9B), one example of an action that may be initiated in response to a determination that a communication link has become unstable is to switch from an active subsystem to an alternate or back-up subsystem. Switching from one subsystem to an alternate subsystem in response to detection of a failure is sometimes referred to as "fail-over." Fail-over or fail-safe features may be useful in computing devices used in controlling mission-critical or safety-critical systems, such as autonomous vehicles (e.g., automobiles, drones, etc.), industrial automation, medical devices, etc.

Figure 12:
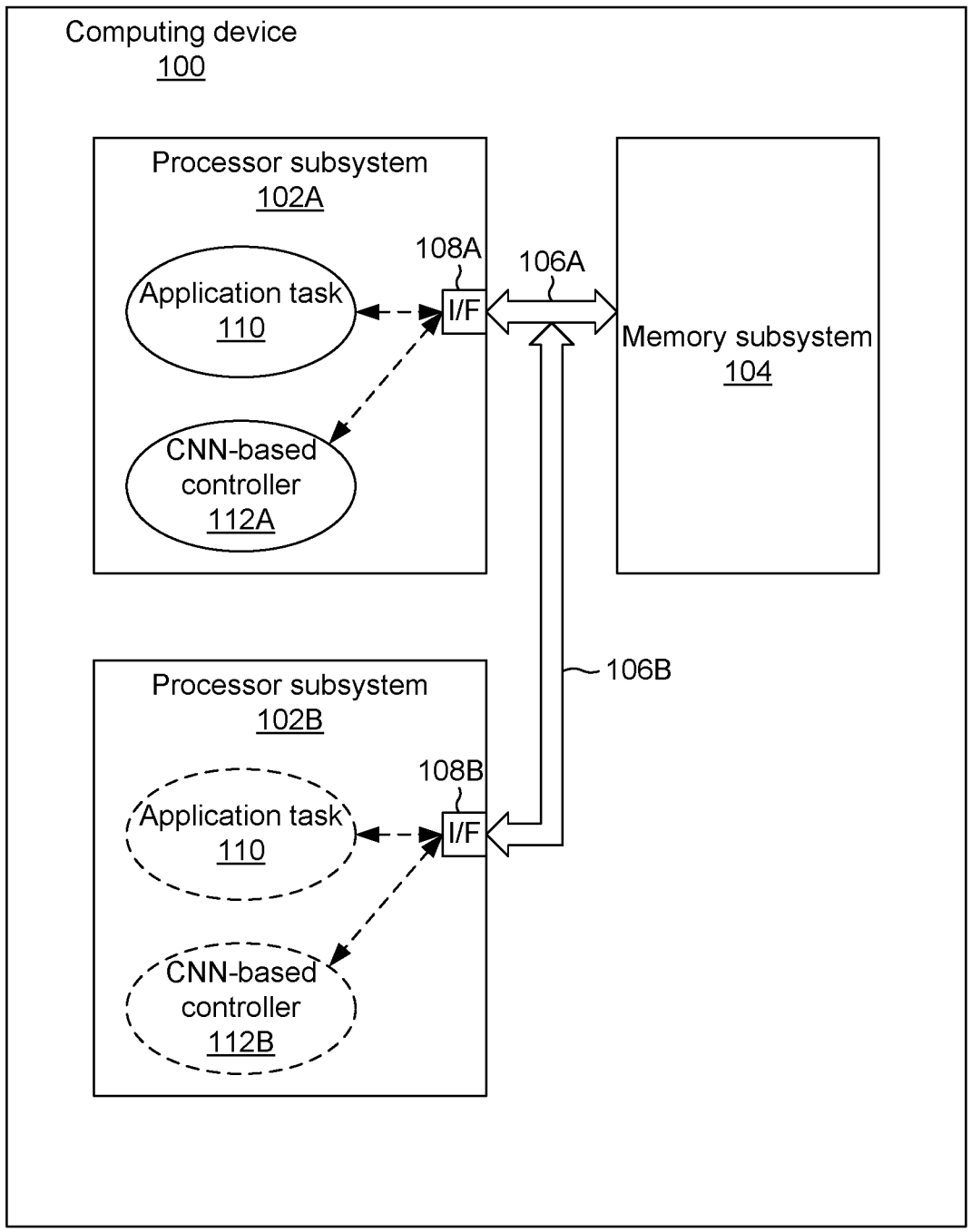
FIG. 12 is a block diagram illustrating a fail-over system for switching subsystems in response to detection of data communication link instability, in accordance with exemplary embodiments.

As illustrated in FIG. 12, a computing device 100 may include a first processor subsystem 102A that is similar to the processor subsystem 102 described above with regard to FIG. 1, and a second processor subsystem 102B that is similar to the first processor subsystem 102A. A first data communication link 106A couples the first processor subsystem 102A to a memory subsystem 104. A second data communication link 106B couples the second processor subsystem 102B to the memory subsystem 104. Although depicted in a conceptual manner in FIG. 12, the first and second data communication links 106A and 106B may be physically distinct or independent from each other.

An application task 110 and a first CNN-based controller 112A may execute on one or more processors (not separately shown) of the first processor subsystem 102A and may have access to the data communication link 106A via a first interface 108A. If the first CNN-based controller 112A, operating in the manner described above, determines that the first data communication link 106A has become unstable, the first CNN-based controller 112A may initiate switching the second processor subsystem 102B in place of the first processor subsystem 102A. This switching may include migrating the application task 110 from the first processor subsystem 102A to the second processor subsystem 102B. The application task 110 thus continues executing on the second processor system 102B and may continue directing data transactions to the memory subsystem 104 but via the second data communication link 106B instead of the first data communication link 106A. The switching may also include a second CNN-based controller 112B beginning to execute on the second processor system 102B. The second CNN-based controller 112B may be similar to the first CNN-based controller 112A and may begin monitoring the second data communication link 106B.

Figure 13:
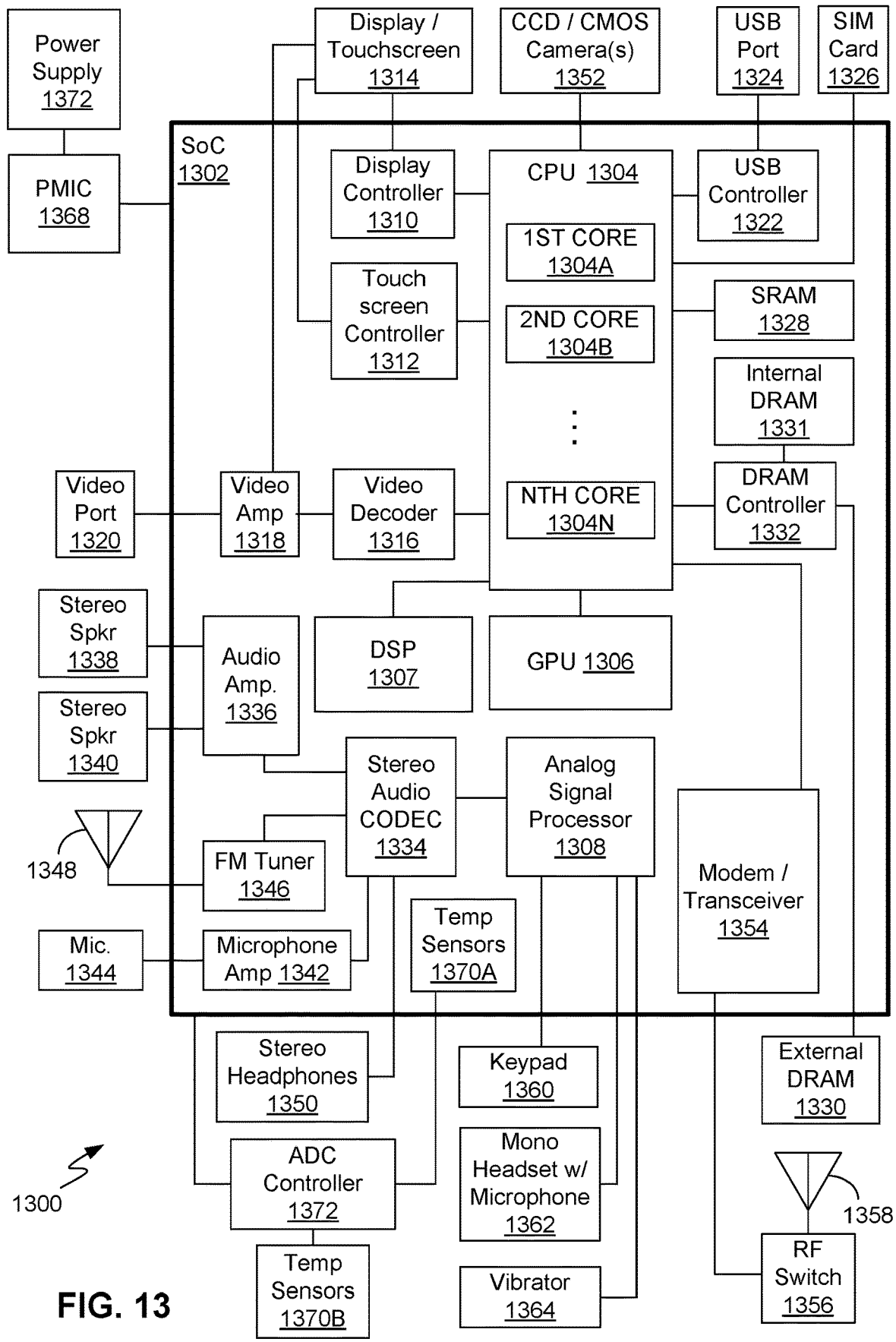
FIG. 13 is a block diagram of a computing device, in accordance with exemplary embodiments.

As illustrated in FIG. 13, exemplary embodiments of systems and methods for maintaining the reliability of a data communication link may be provided in a portable computing device ("PCD") 1300, such as a smartphone. The PCD 1300 may be an example of the computing device 100 more generally described above (FIG. 1). Nevertheless, portability is only an exemplary, relative characteristic of a computing device in accordance with the present disclosure. It is contemplated that in some embodiments a computing device in accordance with the present disclosure may be portable, while in other embodiments a computing device in accordance with the present disclosure may be less portable and included in mission-critical or safety critical equipment, such as autonomous vehicles, drones, industrial automation, etc.

The PCD 1300 may include an SoC 1302. The SoC 1302 may include a CPU 1304, a GPU 1306, a DSP 1307, an analog signal processor 1308, or other processors. The CPU 1304 may include multiple cores, such as a first core 1304A, a second core 1304B, etc., through an Nth core 1304N. In some embodiments, the above-described controller 704 (FIG. 7) may comprise a functional portion of the CPU 1304 or other processor of the PCD 1300.

A display controller 1310 and a touch-screen controller 1312 may be coupled to the CPU 1304. A touchscreen display 1314 external to the SoC 1302 may be coupled to the display controller 1310 and the touch-screen controller 1312. The PCD 1300 may further include a video decoder 1316 coupled to the CPU 1304. A video amplifier 1318 may be coupled to the video decoder 1316 and the touchscreen display 1314. A video port 1320 may be coupled to the video amplifier 1318. A universal serial bus ("USB") controller 1322 may also be coupled to CPU 1304, and a USB port 1324 may be coupled to the USB controller 1322. A subscriber identity module ("SIM") card 1326 may also be coupled to the CPU 1304.

One or more memories may be coupled to the CPU 1304. The one or more memories may include both volatile and non-volatile memories. Examples of volatile memories include static random access memory ("SRAM") 1328 and dynamic RAMs ("DRAM"s) 1330 and 1331. Such memories may be external to the SoC 1302, such as the DRAM 1330, or internal to the SoC 1302, such as the DRAM 1331. A DRAM controller 1332 coupled to the CPU 1304 may control the writing of data to, and reading of data from, the DRAMs 1330 and 1331. In other embodiments, such a DRAM controller may be included within a processor, such as the CPU 1304. An interface (not separately shown in FIG. 13) between the DRAM controller 1332 and the DRAMs 1330 and 1331 may be an example of the data communication link 106 described above with regard to FIG. 1 or the data communication link 506 described above with regard to FIG. 5.

A stereo audio CODEC 1334 may be coupled to the analog signal processor 1308. Further, an audio amplifier 1336 may be coupled to the stereo audio CODEC 1334. First and second stereo speakers 1338 and 1340, respectively, may be coupled to the audio amplifier 1336. In addition, a microphone amplifier 1342 may be coupled to the stereo audio CODEC 1334, and a microphone 1344 may be coupled to the microphone amplifier 1342. A frequency modulation ("FM") radio tuner 1346 may be coupled to the stereo audio CODEC 1334. An FM antenna 1348 may be coupled to the FM radio tuner 1346. Further, stereo headphones 1350 may be coupled to the stereo audio CODEC 1334. Other devices that may be coupled to the CPU 1304 include one or more digital (e.g., CCD or CMOS) cameras 1352.

A modem or RF transceiver 1354 may be coupled to the analog signal processor 1308. An RF switch 1356 may be coupled to the RF transceiver 1354 and an RF antenna 1358. In addition, a keypad 1360, a mono headset with a microphone 1362, and a vibrator device 1364 may be coupled to the analog signal processor 1308.

The SoC 1302 may have one or more internal or on-chip thermal sensors 1370A and may be coupled to one or more external or off-chip thermal sensors 1370B. An analog-to-digital converter ("ADC") controller 1372 may convert voltage drops produced by the thermal sensors 1370A and 1370B to digital signals.

Firmware or software may be stored in any of the above-described memories, such as DRAM 1330 or 1331, SRAM 1328, etc., or may be stored in a local memory directly accessible by the processor hardware on which the software or firmware executes. Execution of such firmware or software may control aspects of any of the above-described methods 800 (FIG. 8), 900 (FIGS. 9A-9B), 1000 (FIGS. 10A-10B), etc., or configure aspects any of the above-described systems. Any such memory or other non-transitory computer-readable medium having firmware or software stored therein in computer-readable form for execution by processor hardware may be an example of a "computer program product," "computer-readable medium," etc., as such terms are understood in the patent lexicon.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

Implementation examples are described in the following numbered clauses:

1. A method for maintaining reliability of a data communication link in a computing device, comprising:
   collecting, by a control system, a two-dimensional array of data points representing a data eye on the data communication link;
   determining, by a convolutional neural network, a score of the two-dimensional array of data points;
   comparing, by the control system, the determined score with a threshold; and
   initiating, by the control system, an action based on a result of comparing the determined score with the threshold.

2. The method of clause 1, wherein collecting the two-dimensional array of data points comprises:
   monitoring, by the control system, a data stream comprising a plurality of transmitted data values and a corresponding plurality of received data values on the data communication link;
   varying, by the control system, while monitoring the plurality of transmitted data values and corresponding plurality of received data values, a reference voltage and a clock-data time delay of the data communication link relative to one another to provide a plurality of combinations of different reference voltages and different clock-data time delays;
   counting, by the control system, a number of times a received data value does not match a corresponding transmitted data value under conditions of each combination of reference voltage and clock-data time delay; and
   forming, by the control system, the two-dimensional array of data points, each data point corresponding to the number of times a received data value does not match a corresponding transmitted data value, each data point positioned in the array at a unique combination of reference voltage and clock-data time delay.

3. The method of clause 1, wherein the data communication link couples a first subsystem and a second subsystem of a computing device.

4. The method of clause 3, wherein the first subsystem comprises a memory chip, and the second subsystem comprises a system-on-a-chip (SoC) having a central processing unit and a memory controller.

5. The method of clause 4, wherein initiating an action comprises switching a data stream from being communicated between the SoC and the memory chip to being communicated between an alternate SoC and the memory chip.

6. The method of clause 1, wherein the convolutional neural network comprises three convolutional layers followed by three dense layers.

7. The method of clause 6, wherein the convolutional neural network comprises a normalization layer between each pair of convolutional layers.

8. The method of clause 7, wherein the convolutional neural network comprises a first convolutional layer followed by a first batch normalization layer followed by a second convolutional layer followed by a second batch normalization layer followed by a third convolutional layer followed by a flattening layer followed by a first dense layer followed by a second dense layer followed by a third dense layer followed by an output layer.

9. The method of clause 1, further comprising, before the determining step:
   performing the collecting step a plurality of times to obtain a plurality of two-dimensional arrays of data points;
   displaying a plurality of images, each image corresponding to one array of data points of the plurality of two-dimensional arrays of data points;
   assigning an assigned score to each array of data points of the plurality of two-dimensional arrays of data points based on the corresponding image; and
   training the convolutional neural network using a plurality of the assigned scores and corresponding two-dimensional arrays of data points.

10. The method of clause 9, wherein training the convolutional neural network comprises back-propagating error information using a mean squared error loss function.

11. The method of clause 10, wherein the mean squared error loss function is weighted to apply a higher loss to determined scores higher than corresponding assigned scores by an amount and a lower loss to determined scores lower than corresponding assigned scores by the amount.

12. A system for maintaining reliability of a data communication link in a computing device, comprising:
   a first subsystem; and
   a second subsystem having at least one processor system and coupled to the first subsystem by the data communication link, the processor system configured to include a convolutional neural network and configured to:
   collect a two-dimensional array of data points representing a data eye on the data communication link;
   determine, using the convolutional neural network, a determined score of the two-dimensional array of data points;
   compare, by the control system, the determined score with a threshold; and
   initiate, by the control system, an action based on a result of comparing the determined score with the threshold.

13. The system of clause 12, wherein the second subsystem is configured to collect the two-dimensional array of data points by being configured to:
   monitor a data stream comprising a plurality of transmitted data values and a corresponding plurality of received data values on the data communication link;
   vary, while monitoring the plurality of transmitted data values and corresponding plurality of received data values, a reference voltage and a clock-data time delay of the data communication link relative to one another to provide a plurality of combinations of different reference voltages and different clock-data time delays;
   count a number of times a received data value matches a corresponding transmitted data value under conditions of each combination of reference voltage and clock-data time delay; and
   form a two-dimensional array of data points, each data point corresponding to the number of times a received data value matches a corresponding transmitted data value, each data point positioned in the array at a unique combination of reference voltage and clock-data time delay.

14. The system of clause 12, wherein the data communication link couples a memory chip with a system-on-a-chip (SoC) having a memory controller.

15. The system of clause 14, wherein the second subsystem is configured to initiate an action by being configured to switch a data stream from being communicated between the SoC and the memory chip to being communicated between an alternate SoC and the memory chip.

16. The system of clause 12, wherein the convolutional neural network comprises three convolutional layers followed by three dense layers.

17. The system of clause 16, wherein the convolutional neural network comprises a normalization layer between each pair of convolutional layers.

18. The system of clause 17, wherein the convolutional neural network comprises a first convolutional layer followed by a first batch normalization layer followed by a second convolutional layer followed by a second batch normalization layer followed by a third convolutional layer followed by a flattening layer followed by a first dense layer followed by a second dense layer followed by a third dense layer followed by an output layer.

19. The system of clause 12, wherein the second subsystem is further configured to:
  collect a plurality of the two-dimensional arrays of data points;
  display a plurality of images, each image corresponding to one array of data points of the plurality of two-dimensional arrays of data points;
  assign an assigned score to each array of data points of the plurality of two-dimensional arrays of data points based on the corresponding image; and
  train the convolutional neural network using a plurality of the assigned scores and corresponding two-dimensional arrays of data points.

20. The system of clause 19, wherein the second subsystem is configured to train the convolutional neural network by being configured to back-propagate error data using a mean squared error loss function.

21. The system of clause 20, wherein the mean squared error loss function is weighted to apply a higher loss to determined scores higher than corresponding assigned scores by an amount and a lower loss to determined scores lower than corresponding assigned scores by the amount.

22. A computer program product for maintaining reliability of a data communication link in a computing device, the computer program product comprising a non-transitory computer-readable medium having stored thereon in computer-executable form instructions that when executed by a processing system configure the processing system to:
  collect a two-dimensional array of data points representing a data eye being communicated on a data communication link;
  determine, using a convolutional neural network, a determined score of the two-dimensional array of data points;
  compare the determined score with a threshold; and
  initiate an action based on a result of comparing the determined score with the threshold.

23. The computer program product of clause 22, wherein the instructions configure the processing system to collect the two-dimensional array of data points by configuring the processing system to:
  monitor a data stream comprising a plurality of transmitted data values and a corresponding plurality of received data values on the data communication link;
  vary, while monitoring the plurality of transmitted data values and corresponding plurality of received data values, a reference voltage and a clock-data time delay of the data communication link relative to one another to provide a plurality of combinations of different reference voltages and different clock-data time delays;
  count a number of times a received data value matches a corresponding transmitted data value under conditions of each combination of reference voltage and clock-data time delay; and
  form a two-dimensional array of data points, each data point corresponding to the number of times a received data value matches a corresponding transmitted data value, each data point positioned in the array at a unique combination of reference voltage and clock-data time delay.

24. The computer program product of clause 23, wherein the convolutional neural network comprises three convolutional layers followed by three dense layers.

25. The computer program product of clause 24, wherein the convolutional neural network comprises a normalization layer between each pair of convolutional layers.

26. The computer program product of clause 25, wherein the convolutional neural network comprises a first convolutional layer followed by a first batch normalization layer followed by a second convolutional layer followed by a second batch normalization layer followed by a third convolutional layer followed by a flattening layer followed by a first dense layer followed by a second dense layer followed by a third dense layer followed by an output layer.

27. The computer program product of clause 22, wherein the instructions further configure the processing system to:
  collect a plurality of the two-dimensional array of data points;
  display a plurality of images, each image corresponding to one array of data points of the plurality of two-dimensional arrays of data points;
  assign an assigned score to each array of data points of the plurality of two-dimensional arrays of data points based on the corresponding image; and
  train the convolutional neural network using a plurality of the assigned scores and corresponding two-dimensional arrays of data points.

28. A system for maintaining reliability of a data communication link in a computing device, comprising:
  means for collecting a two-dimensional array of data points representing a data eye being communicated on the data communication link;
  means for determining a score of the two-dimensional array of data points;
  means for comparing the determined score with a threshold; and
  means for initiating an action based on a result of comparing the determined score with the threshold.

29. The system of clause 28, wherein the data communication link conveys memory traffic between a memory chip and a system-on-a-chip (SoC) having a central processing unit and a memory controller.

30. The system of clause 29, wherein the means for initiating an action comprises means for switching a data stream from being communicated between the SoC and the memory chip to being communicated between an alternate SoC and the memory chip.

What is claimed is:

1. A method for maintaining reliability of a data communication link in a computing device, comprising:
  collecting, by a control system, a two-dimensional array of data points representing a data eye on the data communication link;
  determining, by a convolutional neural network, a score of the two-dimensional array of data points;
  comparing, by the control system, the determined score with a threshold;

initiating, by the control system, an action based on a result of comparing the determined score with the threshold;

counting, by the control system, a number of times a received data value does not match a corresponding transmitted data value under conditions of each combination of reference voltage and clock-data time delay; and forming, by the control system, the two-dimensional array of data points, each data point corresponding to the number of times a received data value does not match a corresponding transmitted data value, each data point positioned in the array at a unique combination of reference voltage and clock-data time delay.

2. The method of claim 1, wherein collecting the two-dimensional array of data points comprises:

monitoring, by the control system, a data stream comprising a plurality of transmitted data values and a corresponding plurality of received data values on the data communication link;

varying, by the control system, while monitoring the plurality of transmitted data values and corresponding plurality of received data values, a reference voltage and a clock-data time delay of the data communication link relative to one another to provide a plurality of combinations of different reference voltages and different clock-data time delays.

3. The method of claim 1, wherein the data communication link couples a first subsystem and a second subsystem of a computing device.

4. The method of claim 3, wherein the first subsystem comprises a memory chip, and the second subsystem comprises a system-on-a-chip (SoC) having a central processing unit and a memory controller.

5. The method of claim 4, wherein initiating an action comprises switching a data stream from being communicated between the SoC and the memory chip to being communicated between an alternate SoC and the memory chip.

6. The method of claim 1, wherein the convolutional neural network comprises three convolutional layers followed by three dense layers.

7. The method of claim 6, wherein the convolutional neural network comprises a normalization layer between each pair of convolutional layers.

8. The method of claim 7, wherein the convolutional neural network comprises a first convolutional layer followed by a first batch normalization layer followed by a second convolutional layer followed by a second batch normalization layer followed by a third convolutional layer followed by a flattening layer followed by a first dense layer followed by a second dense layer followed by a third dense layer followed by an output layer.

9. The method of claim 1, further comprising, before the determining step:

performing the collecting step a plurality of times to obtain a plurality of two-dimensional arrays of data points;

displaying a plurality of images, each image corresponding to one array of data points of the plurality of two-dimensional arrays of data points;

assigning an assigned score to each array of data points of the plurality of two-dimensional arrays of data points based on the corresponding image; and training the convolutional neural network using a plurality of the assigned scores and corresponding two-dimensional arrays of data points.

10. The method of claim 9, wherein training the convolutional neural network comprises back-propagating error information using a mean squared error loss function.

11. The method of claim 10, wherein the mean squared error loss function is weighted to apply a higher loss to determined scores higher than corresponding assigned scores by an amount and a lower loss to determined scores lower than corresponding assigned scores by the amount.

12. A system for maintaining reliability of a data communication link in a computing device, comprising:

a first subsystem; and a second subsystem having at least one processor system and coupled to the first subsystem by the data communication link, the processor system configured to include a convolutional neural network and configured to:

collect a two-dimensional array of data points representing a data eye on the data communication link;

determine, using the convolutional neural network, a determined score of the two-dimensional array of data points;

compare, by the control system, the determined score with a threshold; and initiate, by the control system, an action based on a result of comparing the determined score with the threshold;

count a number of times a received data value matches a corresponding transmitted data value under conditions of each combination of reference voltage and clock-data time delay; and form a two-dimensional array of data points, each data point corresponding to the number of times a received data value matches a corresponding transmitted data value, each data point positioned in the array at a unique combination of reference voltage and clock-data time delay.

13. The system of claim 12, wherein the second subsystem is configured to collect the two-dimensional array of data points by being configured to:

monitor a data stream comprising a plurality of transmitted data values and a corresponding plurality of received data values on the data communication link;

vary, while monitoring the plurality of transmitted data values and corresponding plurality of received data values, a reference voltage and a clock-data time delay of the data communication link relative to one another to provide a plurality of combinations of different reference voltages and different clock-data time delays.

14. The system of claim 12, wherein the data communication link couples a memory chip with a system-on-a-chip (SoC) having a memory controller.

15. The system of claim 14, wherein the second subsystem is configured to initiate an action by being configured to switch a data stream from being communicated between the SoC and the memory chip to being communicated between an alternate SoC and the memory chip.

16. The system of claim 12, wherein the convolutional neural network comprises three convolutional layers followed by three dense layers.

17. The system of claim 16, wherein the convolutional neural network comprises a normalization layer between each pair of convolutional layers.

18. The system of claim 17, wherein the convolutional neural network comprises a first convolutional layer followed by a first batch normalization layer followed by a second convolutional layer followed by a second batch normalization layer followed by a third convolutional layer followed by a flattening layer followed by a first dense layer followed by a second dense layer followed by a third dense layer followed by an output layer.

19. The system of claim 12, wherein the second subsystem is further configured to:
   collect a plurality of the two-dimensional arrays of data points;
   display a plurality of images, each image corresponding to one array of data points of the plurality of two-dimensional arrays of data points;
   assign an assigned score to each array of data points of the plurality of two-dimensional arrays of data points based on the corresponding image; and
   train the convolutional neural network using a plurality of the assigned scores and corresponding two-dimensional arrays of data points.

20. The system of claim 19, wherein the second subsystem is configured to train the convolutional neural network by being configured to back-propagate error data using a mean squared error loss function.

21. The system of claim 20, wherein the mean squared error loss function is weighted to apply a higher loss to determined scores higher than corresponding assigned scores by an amount and a lower loss to determined scores lower than corresponding assigned scores by the amount.

22. A computer program product for maintaining reliability of a data communication link in a computing device, the computer program product comprising a non-transitory computer-readable medium having stored thereon in computer-executable form instructions that when executed by a processing system configure the processing system to:
   collect a two-dimensional array of data points representing a data eye being communicated on a data communication link;
   determine, using a convolutional neural network, a determined score of the two-dimensional array of data points;
   compare the determined score with a threshold;
   initiate an action based on a result of comparing the determined score with the threshold;
   count a number of times a received data value matches a corresponding transmitted data value under conditions of each combination of reference voltage and clock-data time delay; and
   form a two-dimensional array of data points, each data point corresponding to the number of times a received data value matches a corresponding transmitted data value, each data point positioned in the array at a unique combination of reference voltage and clock-data time delay.

23. The computer program product of claim 22, wherein the instructions configure the processing system to collect the two-dimensional array of data points by configuring the processing system to:
   monitor a data stream comprising a plurality of transmitted data values and a corresponding plurality of received data values on the data communication link;
   vary, while monitoring the plurality of transmitted data values and corresponding plurality of received data values, a reference voltage and a clock-data time delay of the data communication link relative to one another to provide a plurality of combinations of different reference voltages and different clock-data time delays.

24. The computer program product of claim 23, wherein the convolutional neural network comprises three convolutional layers followed by three dense layers.

25. The computer program product of claim 24, wherein the convolutional neural network comprises a normalization layer between each pair of convolutional layers.

26. The computer program product of claim 25, wherein the convolutional neural network comprises a first convolutional layer followed by a first batch normalization layer followed by a second convolutional layer followed by a second batch normalization layer followed by a third convolutional layer followed by a flattening layer followed by a first dense layer followed by a second dense layer followed by a third dense layer followed by an output layer.

27. The computer program product of claim 22, wherein the instructions further configure the processing system to:
   collect a plurality of the two-dimensional array of data points;
   display a plurality of images, each image corresponding to one array of data points of the plurality of two-dimensional arrays of data points;
   assign an assigned score to each array of data points of the plurality of two-dimensional arrays of data points based on the corresponding image; and
   train the convolutional neural network using a plurality of the assigned scores and corresponding two-dimensional arrays of data points.

28. A system for maintaining reliability of a data communication link in a computing device, comprising:
   means for collecting a two-dimensional array of data points representing a data eye being communicated on the data communication link;
   means for determining a score of the two-dimensional array of data points;
   means for comparing the determined score with a threshold; and
   means for initiating an action based on a result of comparing the determined score with the threshold;
   means for counting a number of times a received data value does not match a corresponding transmitted data value under conditions of each combination of reference voltage and clock-data time delay; and
   means for forming the two-dimensional array of data points, each data point corresponding to the number of times a received data value does not match a corresponding transmitted data value, each data point positioned in the array at a unique combination of reference voltage and clock-data time delay.

29. The system of claim 28, wherein the data communication link conveys memory traffic between a memory chip and a system-on-a-chip (SoC) having a central processing unit and a memory controller.

30. The system of claim 29, wherein the means for initiating an action comprises means for switching a data stream from being communicated between the SoC and the memory chip to being communicated between an alternate SoC and the memory chip.

\* \* \* \* \*